(12) United States Patent
Wilkinson

(10) Patent No.: US 8,753,488 B2
(45) Date of Patent: Jun. 17, 2014

(54) ADVANCED NANO TECHNOLOGY FOR GROWING METALLIC NANO-CLUSTERS

(75) Inventor: James T. Wilkinson, Littleton, CO (US)

(73) Assignee: JTW, LLC, Highlands Ranch, CO (US)

( * ) Notice: Subject to any disclaimer, the term of this patent is extended or adjusted under 35 U.S.C. 154(b) by 0 days.

(21) Appl. No.: 13/532,624

(22) Filed: Jun. 25, 2012

(65) Prior Publication Data

US 2012/0325646 A1    Dec. 27, 2012

Related U.S. Application Data

(60) Provisional application No. 61/500,754, filed on Jun. 24, 2011.

(51) Int. Cl.
*B01J 19/12* (2006.01)

(52) U.S. Cl.
USPC ............... 204/156; 422/186.21; 422/186.23; 422/186.28

(58) Field of Classification Search
USPC ............. 422/186.23, 186.04, 186.21, 186.28; 204/156
See application file for complete search history.

(56) References Cited

U.S. PATENT DOCUMENTS

| | | | | |
|---|---|---|---|---|
| 512,340 | A | | 1/1894 | Tesla |
| 2,582,903 | A | * | 1/1952 | Guanella et al. ......... 422/186.04 |
| 3,390,980 | A | * | 7/1968 | Orbach et al. ............ 422/186.22 |
| 3,458,284 | A | * | 7/1969 | Groves et al. ............ 422/186.04 |
| 3,504,480 | A | * | 4/1970 | Copcutt et al. ............... 335/255 |
| 3,513,337 | A | * | 5/1970 | Greber ............................ 310/11 |
| 3,526,081 | A | * | 9/1970 | Kusters .................... 422/186.04 |
| 3,558,286 | A | * | 1/1971 | Gourdine ................. 422/186.04 |
| 3,653,185 | A | * | 4/1972 | Scott et al. ............... 422/186.04 |
| 3,677,931 | A | * | 7/1972 | O'Hare .................... 422/186.04 |
| 3,716,966 | A | * | 2/1973 | De Seversky ..................... 422/4 |
| 3,718,819 | A | * | 2/1973 | Miksitz ........................ 204/168 |
| 3,738,828 | A | * | 6/1973 | Inoue ............................ 204/164 |
| 3,755,122 | A | * | 8/1973 | Melcher et al. ............... 204/554 |
| 3,764,272 | A | * | 10/1973 | Sterling .................... 422/186.2 |

(Continued)

FOREIGN PATENT DOCUMENTS

| | | |
|---|---|---|
| GB | 2330507 A | 4/1999 |
| RU | 2150326 | 6/2000 |

OTHER PUBLICATIONS

University of Illinois, Ultrafast laser spectroscopy tracks energy flow, www.rdmag.com, R&D Magazine-Aug. 2002.

(Continued)

*Primary Examiner* — Keith Hendricks
*Assistant Examiner* — Colleen M Raphael
(74) *Attorney, Agent, or Firm* — Kunzler Law Group

(57) ABSTRACT

An apparatus for growing nano-clusters includes a pair of electrodes separated by an electrode pair spacing and a field generation module that generates a corona discharge across the electrodes. The corona discharge generates an electromagnetic field near the electrodes. A voltage potential across the electrodes is a medium voltage. The field generation module includes a medium voltage module that generates a medium voltage waveform, which is transmitted to the electrodes to generate the corona discharge. The field generation module includes a broad frequency generation module that generates a broad spectrum of frequencies within the medium voltage waveform. A raw material feeder module feeds particles of a raw material through the electromagnetic field. The electromagnetic field with the broad spectrum of frequencies is operative to separate at least a portion of the raw material fed through the electromagnetic field into free atoms.

24 Claims, 14 Drawing Sheets

(56) References Cited

U.S. PATENT DOCUMENTS

| | | | | |
|---|---|---|---|---|
| 3,875,034 | A | * | 4/1975 | Adams et al. ............ 422/186.04 |
| 3,958,961 | A | * | 5/1976 | Bakke ........................... 422/176 |
| 4,016,060 | A | * | 4/1977 | Lowther .................. 422/186.15 |
| 4,209,306 | A | * | 6/1980 | Feldman et al. .................. 95/80 |
| 4,354,856 | A | * | 10/1982 | Lewis ........................... 209/214 |
| 4,530,291 | A | * | 7/1985 | Wysk ............................ 110/342 |
| 4,543,543 | A | * | 9/1985 | Blight et al. ................. 333/24.1 |
| 5,135,725 | A | * | 8/1992 | Hendrickson et al. ... 422/186.21 |
| 5,433,832 | A | * | 7/1995 | Rich et al. ................ 422/186.21 |
| 5,490,973 | A | * | 2/1996 | Grothaus et al. ......... 422/186.04 |
| 5,542,967 | A | * | 8/1996 | Ponizovsky et al. ..... 422/186.04 |
| 5,637,198 | A | * | 6/1997 | Breault .................... 422/186.04 |
| 5,909,086 | A | * | 6/1999 | Kim et al. ................ 422/186.16 |
| 6,001,315 | A | * | 12/1999 | Conrad et al. ........... 422/186.16 |
| 6,664,741 | B1 | * | 12/2003 | Krichtafovitch ......... 315/111.91 |
| 6,974,561 | B1 | * | 12/2005 | Thomason ............... 422/186.04 |
| 7,196,337 | B2 | * | 3/2007 | Mikolas ................... 315/111.01 |
| 7,893,588 | B1 | | 2/2011 | Jones |
| 8,137,444 | B2 | * | 3/2012 | Farsad et al. ..................... 96/235 |
| 8,421,006 | B2 | * | 4/2013 | Naqwi et al. ................... 977/901 |
| 2001/0008076 | A1 | * | 7/2001 | Alexander .................... 204/665 |
| 2004/0131513 | A1 | * | 7/2004 | Lazarovich et al. ..... 422/186.21 |
| 2004/0213727 | A1 | * | 10/2004 | Mauro .................... 422/186.04 |
| 2004/0245088 | A1 | | 12/2004 | Gardner |
| 2009/0071328 | A1 | | 3/2009 | Dunn |

OTHER PUBLICATIONS

L.I Mandel'shtam & N.D. Papaleksi, On the Parametric Excitation of Electric Oscillations, Zhurnal teknicheskoy fiziki, 4, No. 1 pp. 5-29, published 1934. (English and Russian Translations).

PCT/US2012/044079, ISR and Written Opinion, Mailed: Sep. 3, 2012.

* cited by examiner

ADVANCED NANO TECHNOLOGY FOR GROWING METALLIC NANO-CLUSTERS

CROSS-REFERENCES TO RELATED APPLICATIONS

This application claims the benefit of U.S. Provisional Patent Application No. 61/500,754 entitled Advanced Nano Technology Device and Method for Growing Metallic Nano-Clusters and filed on Jun. 24, 2011 for James T. Wilkinson, which is incorporated herein by reference.

BACKGROUND

1. Field of the Invention

This invention relates to Advanced Nano-technology Device and Method for Growing metallic nano-clusters utilizing a low energy electromagnetic field.

2. Description of the Related Art

Many ore deposits exist that contain numerous elements, such as copper, gold, silver, and other precious metals, in addition to other elements such as carbon. Traditional refinement methods use heat to create a molten state and the specific densities of the various elements to separate elements into molten layers. Other raw materials, such as coal, may include impurities, such as sulfur and mercury. Various methods are used to refine the precious metals and remove impurities. Traditional refinement processes are inefficient and dangerous and produce toxic byproducts. A promising method of extraction involves growing nano-clusters of a specific element, such as gold. Growing nano-clusters offers a way to improve extraction efficiency.

SUMMARY

From the foregoing discussion, it should be apparent that a need exists to improve extraction of impurities and to separate precious metals. An apparatus for growing nano-clusters is disclosed. The apparatus, in one embodiment, includes a pair of electrodes separated by an electrode pair spacing. The apparatus, in one embodiment, includes a field generation module that generates a corona discharge across the electrodes. The corona discharge generates an electromagnetic field near the electrodes. A voltage potential across the electrodes includes a medium voltage. In one embodiment, the field generation module includes a medium voltage module and a broad frequency generation module. The medium voltage module generates a medium voltage waveform. The medium voltage waveform is transmitted to the electrodes to generate the corona discharge. The broad frequency generation module generates a broad spectrum of frequencies within the medium voltage waveform. The apparatus includes, in one embodiment, a raw material feeder module that feeds particles of a raw material through the electromagnetic field. The electromagnetic field with the broad spectrum of frequencies is operative to separate at least a portion of the raw material fed through the electromagnetic field into free atoms.

In one embodiment, the field generation module also includes an element attraction module that generates one or more attraction frequencies within the medium voltage waveform. Each attraction frequency comprises a frequency selected to cause a resonance within atoms of a specific element. The raw material includes atoms of the specific element. The attraction frequency is operative to cause atoms of the specific element to resonate between the electrodes and gather together in a nano cluster. In one embodiment, the element gathers on one or more of the electrodes. In another embodiment, the element gathers on a side of a reaction chamber within the electromagnetic field.

In one embodiment, the pair of electrodes is a pair of electrodes within a set of two or more pairs of electrodes. In another embodiment, each electrode pair is separated by an electrode pair spacing and each pair of electrodes is separated by an electrode-pair-to-electrode-pair spacing where each pair of electrodes is oriented in a first orientation direction and the electrode-pair-to-electrode-pair spacing between pairs of electrodes is in a direction perpendicular to the electrode pair spacing. In another embodiment, the field generation module includes a duty cycle module that adjusts a duty cycle of the medium voltage waveform transmitted to each pair of electrodes. The duty cycle includes an on time and an off time. The on time and the off time together are a duty cycle period. The on time is a period when the medium voltage waveform is transmitted to a pair of electrodes and the off time is a time when the medium voltage waveform is not transmitted to the pair of electrodes. A starting time of a period of the duty cycle for a pair of electrodes is offset from other start times of periods of the duty cycle of other pairs of electrodes.

In a further embodiment, the set of pairs of electrodes includes three or more pairs of electrodes and the duty cycle module includes a cyclonic module that alternates duty cycles to create a circular pattern of when a medium voltage waveform is transmitted to pairs of electrodes. In another further embodiment, an inverse of the period of the duty cycle is a duty cycle frequency and a switching frequency of the medium voltage waveform is a higher frequency than the duty cycle frequency. In another embodiment, the duty cycle frequency is 10 kHz and the switching frequency is 22 kHz. In another embodiment, the medium voltage module converts an input voltage to one or more medium voltage, direct current ("DC") waveforms and each waveform is transmitted to a pair of electrodes. Each waveform includes a plurality of harmonic frequencies.

In one embodiment, the field generation module includes a power balance module that balances power between pairs of electrodes in the set of pairs of electrodes. In another embodiment, the set of two or more pairs of electrodes are arranged around a reaction chamber where an end of each electrode is closest to the reaction chamber. In one embodiment, each electrode of a pair of electrodes includes a positive electrode and a negative electrode and the positive electrodes of the set of pairs electrodes are arranged in a first plane and the negative electrodes of the set of pairs electrodes are arranged in a second plane. In a further embodiment, the reaction chamber comprises sides and the sides are configured to contain particles of the raw material as the particles of raw material pass through the electromagnetic field.

In one embodiment, the pair of electrodes is oriented vertically. In another embodiment, the raw material feeder feeds the particles of raw material vertically through the electromagnetic field and a gravity force propels the particles of raw material through the electromagnetic field. In another embodiment, the field generation module includes an electromagnetic resonant amplifier that amplifies harmonic frequencies within the medium voltage waveform. In another embodiment, the electromagnetic resonant amplifier includes a rectangular strip with a non-conductive coating. The rectangular strip is wound into a coil and the coil includes a first half of the rectangular strip wound around a second half of the rectangular strip and is connected in a center. Current enters in the first half of the rectangular strip and travels around to the center of the coil and then travels in a reverse direction in the second half of the rectangular strip and out of the second half of the rectangular strip. Space between adjacent sections of the rectangular strip form a capacitive coupling based at least in part on the non-conductive coating.

In one embodiment, the field generation module further comprises an electron spin module that aligns a spin of electrons within the medium voltage waveform. In another embodiment, the electron spin module aligns the spin of electrons within the medium voltage waveform by inducing a magnetic field in a conductor that conducts the medium voltage waveform to the electrodes. In another embodiment, the electron spin module includes one or more magnets surrounding the conductor. In another embodiment, the medium voltage is a voltage between 1,000 volts and 35,000 volts. In a particular embodiment, the medium voltage is a voltage of approximately 10,000 volts.

A system for growing nano-clusters is disclosed. The system includes, in one embodiment, one or more nano-cluster modules. Each nano-cluster module includes two or more pairs of electrodes, a field generation module, and a raw material feeder module. Particles of raw material exiting a nano-cluster module feed into the raw material feeder module of a next nano-cluster module. The electrodes within each electrode pair are separated by an electrode pair spacing and each pair of electrodes is separated by an electrode-pair-to-electrode-pair spacing. Each pair of electrodes is oriented in a first orientation direction and the electrode-pair-to-electrode-pair spacing between pairs of electrodes is in a direction perpendicular to the electrode pair spacing.

The field generation module generates a corona discharge across the electrodes. The corona discharge generates an electromagnetic field near the electrodes and a voltage potential across the electrodes is a medium voltage. In one embodiment, the field generation module includes a medium voltage module that generates a medium voltage waveform and the medium voltage waveform is transmitted to the electrodes to generate the corona discharge. In another embodiment, the field generation module includes a broad frequency generation module that generates a broad spectrum of frequencies within the medium voltage waveform. The raw material feeder module feeds particles of a raw material through the electromagnetic field. The electromagnetic field with the broad spectrum of frequencies is operative to separate at least a portion of the raw material fed through the electromagnetic field into free atoms.

In one embodiment, each field generation module includes an element attraction module that generates an attraction frequency within the medium voltage waveform. The attraction frequency of an element attraction module is a frequency selected to cause a resonance within atoms of a specific element. The raw material includes atoms of the specific element and each nano-cluster module includes an element attraction module with an attraction frequency for a different specific element. In another embodiment, the system includes a material crushing module that crushes large particles of the raw material into smaller particles before being fed into the raw material feeder module.

A method for growing nano-clusters includes generating a medium voltage waveform and transmitting the medium voltage waveform to one or more pairs of electrodes to generate corona discharge across each pair of electrodes. Electrodes within each pair of electrodes are separated by an electrode pair spacing. Each pair of electrodes is separated by an electrode-pair-to-electrode-pair spacing. The corona discharge generates an electromagnetic field near the electrodes and a voltage potential across the electrodes is a medium voltage. The method includes generating a broad spectrum of frequencies within the medium voltage waveform. The method includes, in one embodiment, generating one or more an attraction frequencies within the medium voltage waveform. Each attraction frequency comprises a frequency selected to cause a resonance within atoms of a specific element.

The method includes feeding particles of a raw material through the electromagnetic field. The raw material includes atoms of the specific element. The electromagnetic field with the broad spectrum of frequencies is operative to separate at least a portion of the raw material fed through the electromagnetic field into free atoms and the attraction frequency is operative to cause atoms of the specific element to resonate between the electrodes and gather in a nano-cluster. The nano-clusters may gather on one or more of the electrodes or on a side of a reaction chamber in the electromagnetic field. In one embodiment, the method includes cycling the medium voltage waveform for each pair of electrodes at a duty cycle rate. An on time for each duty cycle for a pair of electrodes is offset from the on time for the duty cycles of other pairs of electrodes.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
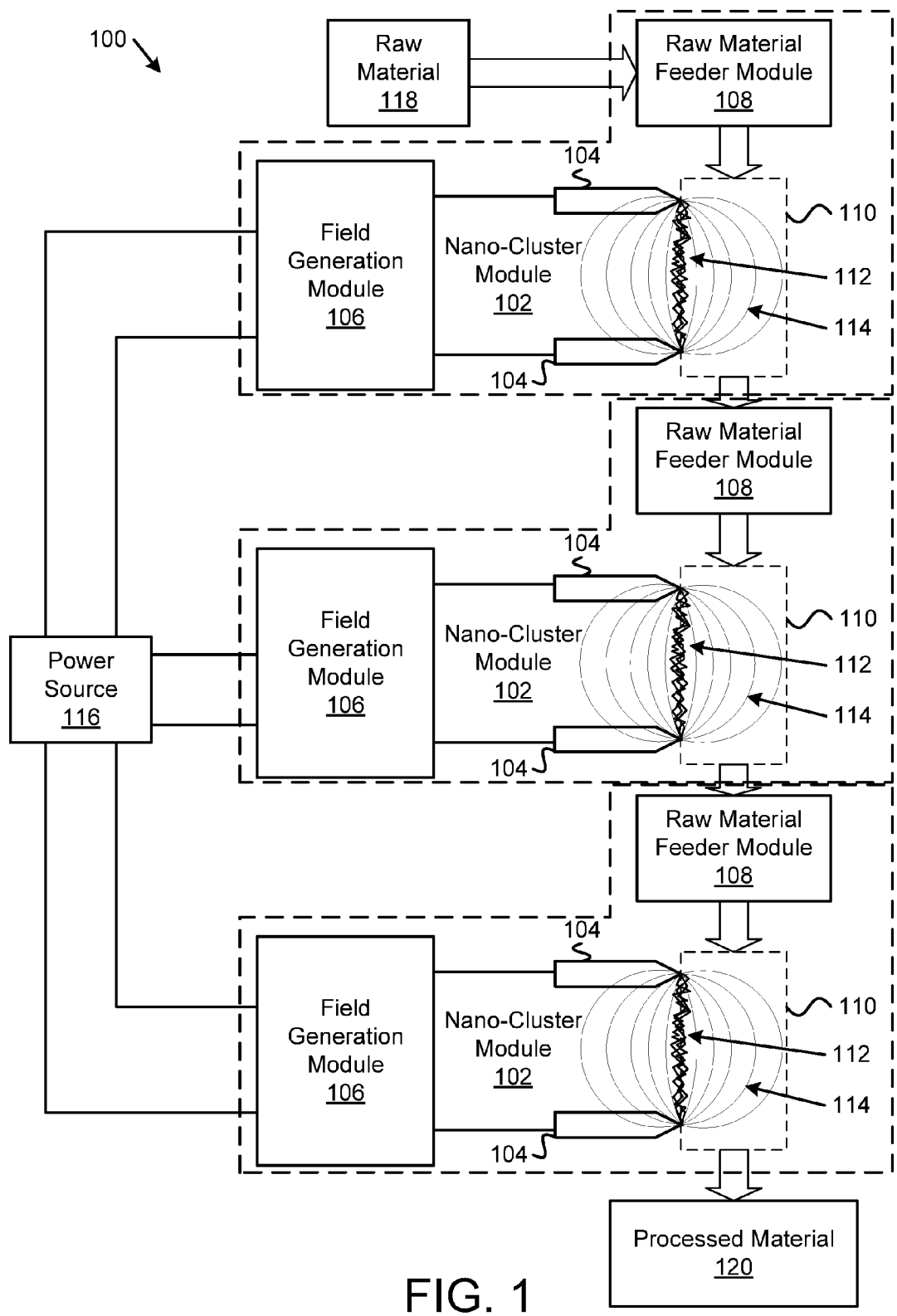
FIG. 1 is a schematic block diagram illustrating one embodiment of a system for growing nano-clusters in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 is a schematic block diagram illustrating one embodiment of a system 100 for growing nano-clusters in accordance with the present invention. The system 100 includes nano-cluster modules 102 with electrodes 104, a field generation module 106, a raw material feeder module 108, a reaction zone 110, a corona discharge 112, and an electromagnetic field 114, a power source 116, raw material 118, and processed material 120, which are described below.

The system 100 includes one or more nano-cluster modules 102 for growing nano-clusters. In one embodiment, a nano-cluster module 102 receives raw material 118 and feeds another nano-cluster module 102, which then feeds another nano-cluster module 102. Processed material 120 may result from a nano-cluster module 102. In other embodiments, one or more nano-cluster modules 102 are part of a system with additional processing steps (not shown). Typically a nano-cluster module 102 is fed by a power source 116, which may be a utility, a generator, a power supply, or other power source 116 known to one of skill in the art. The power source 116 may provide an alternating current ("AC") voltage or a direct current ("DC") voltage.

In one embodiment, the nano-cluster module 102 includes one or more pairs of electrodes 104. The electrodes 104 are spaced at an electrode pair spacing. The electrode pair spacing may be spaced based on a voltage potential across the electrodes 104 and may be chosen to allow a corona discharge 112 across the electrodes 104. The corona discharge 112 creates an electromagnetic field 114 surrounding the corona discharge 112. A reaction zone 110 is chosen as a location where raw material 118 passes through the electromagnetic field 114.

As particles of the raw material 118 pass through the electromagnetic field 114, some molecules of the particles of raw material 118 break into free atoms as energy at various frequencies within the electromagnetic field 114 break bonds between atoms of the molecules. The free atoms may then recombine. In one embodiment, the free atoms combine into new molecules that are typically more pure than the raw material. In another embodiment, the new molecules grow nano-clusters on the electrodes 104 while other new molecules pass through the electromagnetic field 114 and become processed material 120. A nano-cluster, in one embodiment, is a cluster of atoms of the same element. A nano-cluster may include several elements where atoms of a particular element are clustered together. Nano-clusters may also be in the form of a crystalline structure. The processed material 120 may be a more pure form of the raw material 118 with fewer impurities.

The electrodes 104 comprise a conductive material. For example, the electrodes 104 may be carbon, copper, stainless steel, brass, or any other type of conductive material. In one embodiment, an electrode 104 is copper clad carbon. In another embodiment, an electrode 104 is a welding rod. In another embodiment, an electrode 104 is made of multiple materials. For example, an electrode 104 may be of one material at a connection end and then may transition to another material close where the corona discharge 112 is expected. In various embodiments, an electrode 104 may cylindrical, square, or other shape and may have, at a point of expected corona discharge 112, a pointed end, a blunt end, a rounded end, a sharp end, or other shape. One of skill in the art will recognize other shapes and materials suitable for an electrode 104 used with a corona discharge 112.

In one embodiment, the nano-cluster module 102 includes a field generation module 106 that generates the corona discharge 112 across the electrodes 104. A voltage potential across the electrodes 104 is a medium voltage. Medium voltage may be any voltage that generates corona discharge 112 across the electrodes 104. In one embodiment, the medium voltage is a voltage greater than 1000 volts ("V"). In another embodiment, the medium voltage is within a range of 1000 V to 35,000 V. In another embodiment, the field generation module 106 generates the corona discharge 112 with a voltage that is above 35,000 V. In another embodiment, the field generation module 106 generates the corona discharge 112 with a voltage that is below 1,000 V. In one embodiment, the field generation module 106 generates the corona discharge 112 with a voltage that is 10,000 V. One of skill in the art will recognize other voltages suitable for creating corona discharge 112 of a nature to grown nano-clusters.

The field generation module 106, in one embodiment, generates a medium voltage waveform. The medium voltage waveform is transmitted to the electrodes 104 to generate the corona discharge 112. The field generation module 106, in another embodiment, generates a broad spectrum of frequencies within the medium voltage waveform. The broad spectrum of frequencies includes frequencies and energy levels suitable to break molecules of particles of the raw material 118 into free atoms. Generation of the medium voltage waveform with the broad spectrum of frequencies is discussed in more detail below.

The nano-cluster module 102 includes a reaction zone 110 that includes at least a portion of the electromagnetic field 114. The reaction zone 110 may include a zone that is close to the corona discharge 112 and may include an area where the electromagnetic field 114 is strongest. The reaction zone 110 is a location where raw material 118 passes through the electromagnetic field 114. In one embodiment, the reaction zone 110 is open on multiple sides and raw material 118 passes through the reaction zone 110 based on momentum of particles of the raw material 118. In another embodiment, the reaction zone 110 includes a reaction chamber that has sides to contain the raw material 118 as the raw material 118 passes through the electromagnetic field 114. One of skill in the art will recognize other forms of a reaction zone 110 where particles of raw material 118 pass through the electromagnetic field 114.

In one embodiment, the nano-cluster module 102 includes a raw material feeder module 108 that feeds particles of the raw material 114 through the electromagnetic field 114. The electromagnetic field 114 includes the broad spectrum of frequencies and is operative to separate at least a portion of the raw material 118 fed through the electromagnetic field 114 into free atoms. The raw material feeder module 108, in one embodiment, transports the raw material 118 above the reaction zone 110 and feeds the raw material 118 through the reaction zone 110 by force of gravity. In other embodiments, raw material feeder module 108 propels particles of the raw material 118 through the reaction zone 110, for example using a flow of air or other fluid carrier. In various embodiments, the raw material feeder module 108 includes multiple stages, such as a conveyor belt, a magnetic separator, a screen to remove oversized particles, metering to control feed rate, and the like. One of skill in the art will recognize other forms of a raw material feeder module 108.

The raw material 118 includes molecules with atoms of multiple elements. In one embodiment, the raw material 118 includes molecules in a less pure form and the nano-cluster module 102 separates impurities resulting in a processed material 120 that is a more pure form of the raw material 118. In another embodiment, the raw material includes atoms that grow into nano-clusters. The atoms maybe of a desirable element. For example, atoms separated from the raw material 118 may include mercury, gold, silver, platinum, iron, copper, carbon, and other elements. The nano-cluster module 102 may grow nano-clusters with high concentrations of these elements, such as gold. In one embodiment, the nano-cluster module 102 grows the nano-clusters on one or more of the electrodes 104. In another embodiment, the nano-cluster module 102 grows the nano-clusters on another structure, such as sides of a reaction chamber that is part of the reaction zone 110.

In one embodiment, the raw material 118 is in a particle form. The particles of the raw material 118 may be small particles. Small particles of the raw material 118 may be in a form such that more of the raw material 118 separates into free atoms than if the raw material 118 included larger particles. In one embodiment, the system 100 includes a crusher (not shown) that crushes the raw material 118 into fine particles. For example, coal with impurities may be crushed into a fine powder and fed into the nano-cluster module 102. A more pure coal may be the processed material 120. In one embodiment, the system 100 includes a pelletizer (not shown) that combines the processed material 120 into pellets. For example, where the processed material 120 is coal, the pelletizer may combine the processed material 120 into pellets useful for a coal fired power plant. The nano-cluster module 102 may purify the coal to remove a portion of sulfur, mercury, or other undesirable elements.

Figure 2:
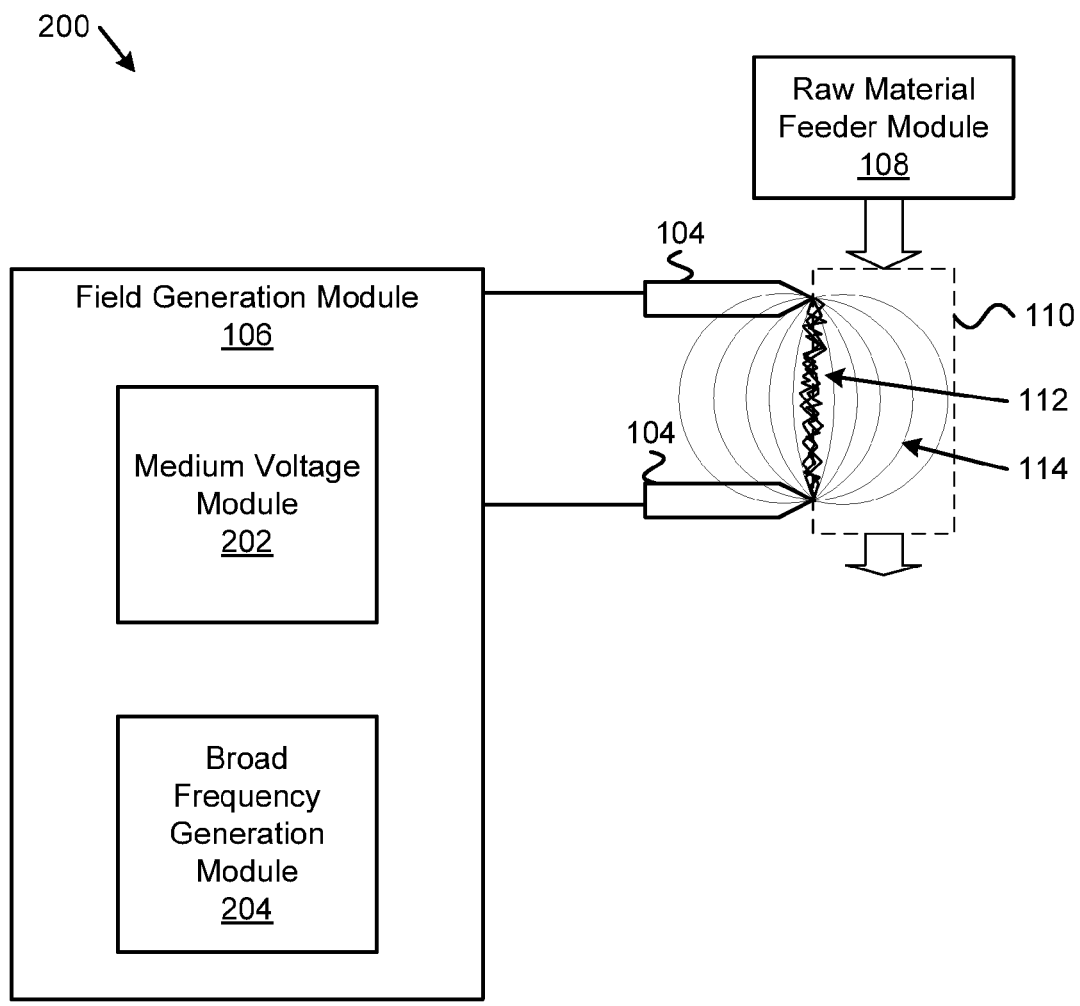
FIG. 2 is a schematic block diagram illustrating one embodiment of an apparatus for growing nano-clusters in accordance with the present invention.

FIG. 2 is a schematic block diagram illustrating one embodiment of an apparatus 200 for growing nano-clusters in accordance with the present invention. The apparatus 200 includes electrodes 104, a field generation module 106, a raw material feeder module 108, a reaction zone 110, a corona discharge 112, and an electromagnetic field 114, which are substantially similar to those described in relation to the system 100 of FIG. 1. The apparatus 200 also includes a field generation module 106 with a medium voltage module 202 and a broad frequency generation module 204, which are described below.

The apparatus 200, in one embodiment, includes a field generation module 106 with a medium voltage module 202 that generates a medium voltage waveform. The medium voltage waveform is transmitted to the electrodes 104 to generate the corona discharge 112. The medium voltage module 202, in one embodiment, converts a source voltage to a medium voltage. For example, the source voltage may originate with a utility, a generator, a fuel cell, or other power source 116. The source voltage may be 120 V single-phase, 208 or 480 V three-phase, 24 DC, or other common source voltage. The medium voltage, in one embodiment, may range from and industry standard medium voltage range of 1000 V to 35,000 V, but may also be higher or lower than this range.

Figure 5:
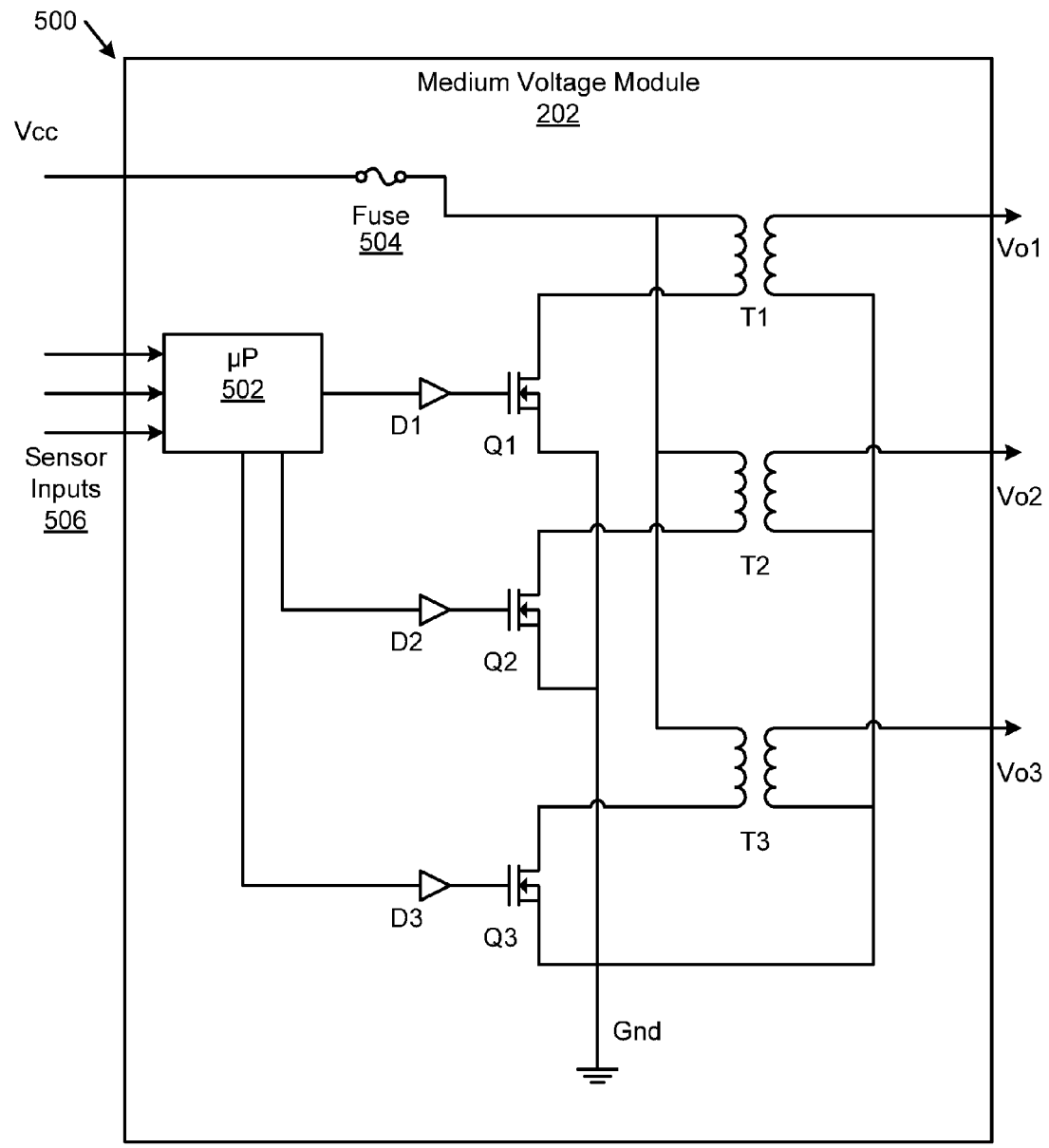
FIG. 5 is a schematic block diagram illustrating one embodiment of a medium voltage module in accordance with the present invention.

In one embodiment, the medium voltage module 202 provides a power level adequate to break molecular bonds in particles of the raw material 118. In another embodiment, the medium voltage module 202 supplies multiple sets of electrodes 104. In one embodiment, the medium voltage module 202 includes a circuit as depicted in FIG. 5, which is discussed in more detail below. The medium voltage module 202, in another embodiment, may provide a medium voltage waveform to multiple pairs of electrodes 104 where each pair of electrodes 104 is controlled on and off at a periodic rate such that a duty cycle for a pair of electrodes 104 may be less than one.

In one embodiment, the apparatus 200 include a field generation module 106 with a broad frequency generation module 204 that generates a broad spectrum of frequencies within the medium voltage waveform. In one embodiment, at least a portion of the broad frequency generation module 204 is incorporated in the medium voltage module 202. In another embodiment, the medium voltage module 202 may generate various frequencies and a portion of the broad frequency generation module 204 amplifies the various frequencies. For example, the medium voltage module 202 may be a switching DC-to-DC converter that switches as a specific frequency and may generate harmonic frequencies as waveforms transition between a low value and a high value, or an off value and an on value. The harmonics may include a broad spectrum of frequencies. Another portion of the broad frequency generation module 204 may then amplify the harmonic frequencies.

In another embodiment, the broad frequency generation module 204 comprises components specifically chosen so that particular harmonic frequencies are present. For example, specific inductance values, capacitance values, and resistance values may be used in a design to generate a broad spectrum of frequencies. The inductance, resistance, and capacitance values may be part of a design of certain components, such as a transformer, or may be implemented with discrete components, or both. In another embodiment, the broad frequency generation module 204 may include one or more frequency generators to generate specific frequencies used in conjunction with the medium voltage module 202 to achieve the broad spectrum of frequencies within the medium voltage waveform. The broad spectrum of frequencies, along with voltage and power levels of the medium voltage waveform enable breaking molecular bonds in within molecules of particles of the raw material 118.

Figure 3:
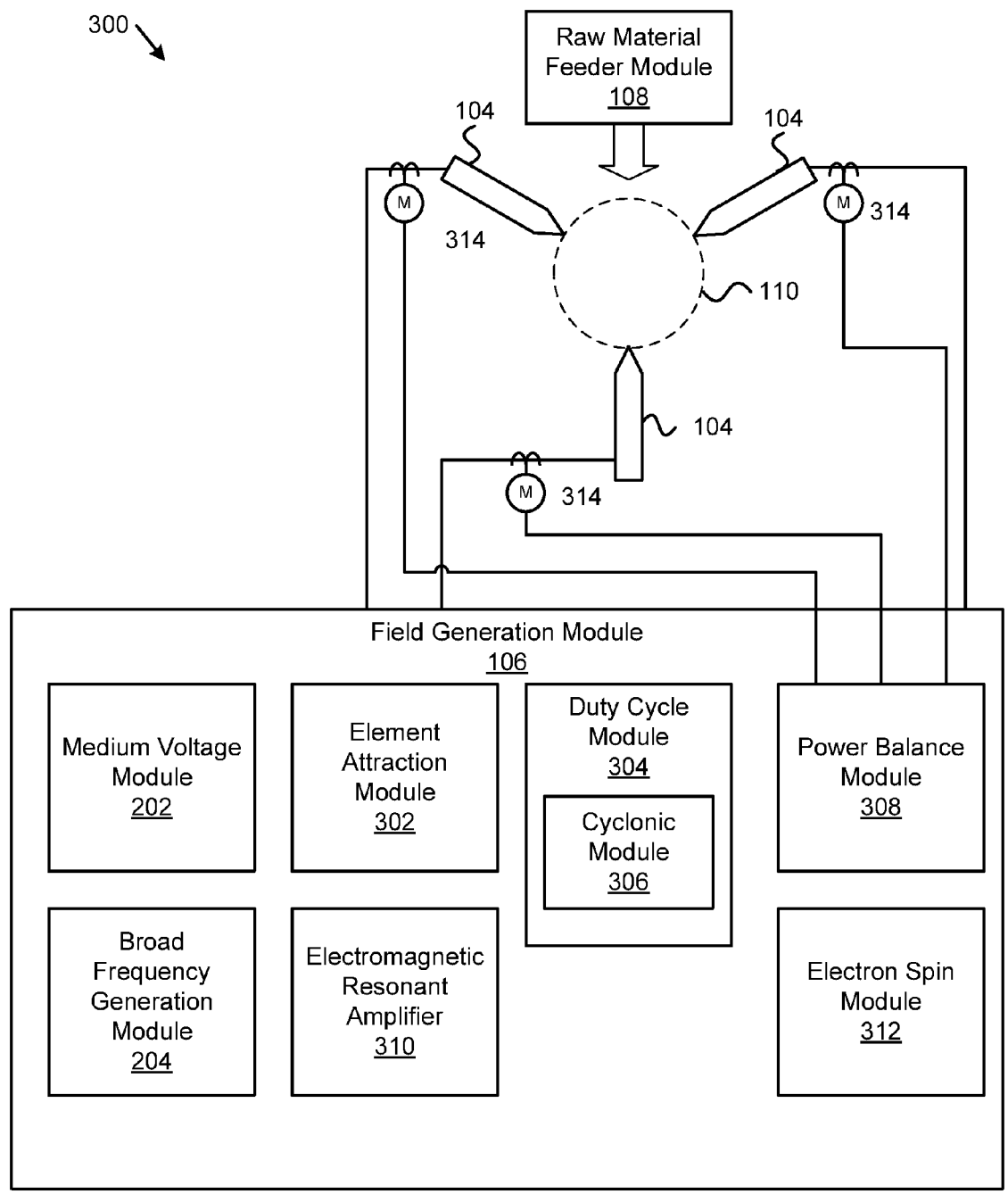
FIG. 3 is a schematic block diagram illustrating another embodiment of an apparatus for growing nano-clusters in accordance with the present invention.

FIG. 3 is a schematic block diagram illustrating another embodiment of an apparatus 300 for growing nano-clusters in accordance with the present invention. The apparatus 300 includes electrodes 104, a field generation module 106 with a medium voltage module 202 and a broad frequency generation module 204, a raw material feeder module 108, a reaction zone 110, a corona discharge 112, and an electromagnetic field 114, which are similar to those described in relation to the system 200 of FIG. 2. The apparatus 300 also includes an element attraction module 302, a duty cycle module 304 with a cyclonic module 306, a power balance module 308, an electromagnetic resonant amplifier 310, an electron spin module 312, and power sensors 314, which are described below.

The apparatus 300 includes, in the depicted embodiment, three pairs of electrodes 104. One pair, two pair, three pair, six pair of electrodes 104, or other combinations of pairs may also be used. In the particular embodiment depicted, a circular reaction zone 110 is included and may be merely an identified area where raw material 118 is fed from the raw material feeder module 108. In another embodiment, the reaction zone 110 is a reaction chamber bounded by physical barriers to guide raw material 118 through the electromagnetic field 114. For example, the reaction chamber may be a tube to guide raw material 118 through the electromagnetic field 114. In one embodiment, the reaction zone 110 and associated reaction chamber is sized so that ends of the electrodes 104 protrude into the reaction chamber. In another embodiment, the electrodes 104 are outside the reaction chamber. In another embodiment, the electrodes 104 extend within a physical structure of the reaction zone but do not extend inside the reaction chamber. The reaction zone 110 or reaction chamber may be any shape suitable to allow or guide raw material 118 to pass through the electromagnetic field 114.

The apparatus 300, in one embodiment, includes an element attraction module 302 that generates one or more attraction frequencies within the medium voltage waveform. Each attraction frequency includes a frequency selected to cause a resonance within atoms of a specific element. For example, the raw material 118 may include atoms of the specific element and the element attraction module 302 may facilitate collection of the specific element. In one embodiment, the attraction frequency generated by the element attraction module 302 is operative to cause atoms of the specific element to resonate between electrodes 104 and gather on one or more of the electrodes 104. In another embodiment, the element attraction module 302 causes a specific element to resonate and gather at a side of a reaction chamber.

In one embodiment, the element attraction module 302 is combined with the broad frequency generation module 204 to generate a broad spectrum of frequencies including a specific frequency that causes atoms of a specific element to resonate. For example, if mercury is the specific element, the broad spectrum of frequencies may include a frequency that causes mercury to resonate so that free atoms of mercury may resonate in the reaction zone 110 and gather on an electrode 104 or on one or more sides of the reaction chamber. In another embodiment, the element attraction module 302 is configured to generate a specific frequency, for example using a frequency generator, and then added to frequencies generated by the broad frequency generation module 204. In one embodiment, a system 100 may include more than one nano-cluster module 102 and each nano-cluster module 102 may include an element attraction module 302 that generates a different frequency such that each nano-cluster module 102 is more likely to attract more of one element than other elements and may grow nano-clusters richer in the one element.

The apparatus 300, in one embodiment, includes a duty cycle module 304 that adjusts a duty cycle of the medium voltage waveform transmitted to each pair of electrodes 104. A duty cycle, as described herein, includes an on time and an off time and the on time and the off time make up a duty cycle period. In one embodiment, the duty cycle period is fixed and an inverse of the duty cycle period is a frequency. For example, a duty cycle of 30% (or 0.3) indicates an on time of 30% and an off time of 70%. The on time, in one embodiment, is a period when the medium voltage waveform is transmitted to a pair of electrodes 104 and the off time is a time when the medium voltage waveform is not intentionally transmitted to the pair of electrodes 104.

Where the duty cycle period corresponds to a fixed frequency, the medium voltage waveform may include other frequencies. For example, during the duty cycle on time, the medium voltage module 202, broad frequency generation module 204, and/or the element attraction module 302 may generate a base switching frequency that is higher than the duty cycle frequency, along with other harmonic frequencies higher than the base switching frequency. In one particular embodiment, the duty cycle switching frequency is 10 kilo hertz ("kHz") and the base switching frequency is 22 kHz and other harmonic frequencies of the base switching frequency are also included in the medium voltage waveform.

Figure 6A:
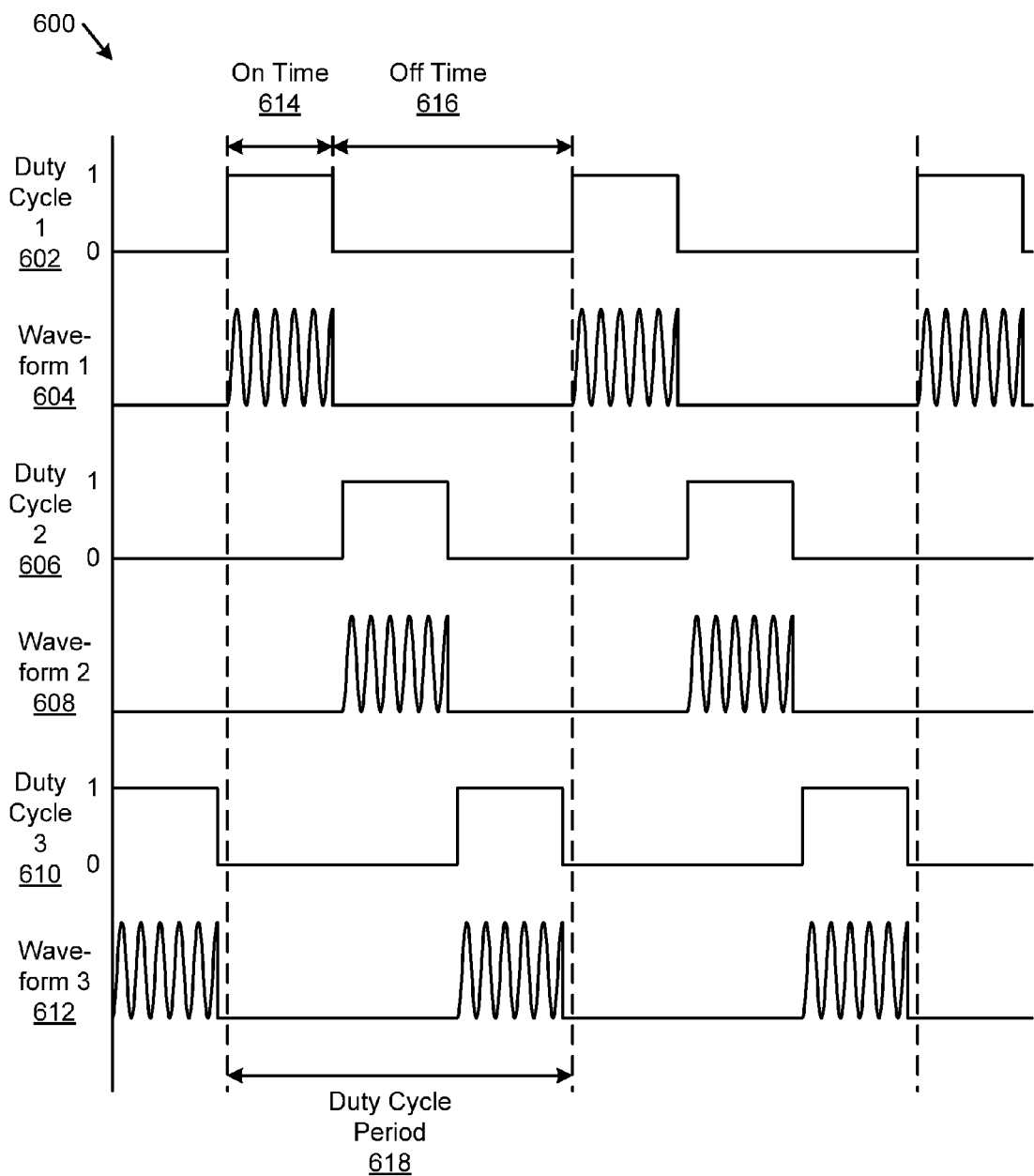
FIG. 6A is a one embodiment of a duty cycle timing diagram for three electrode pairs in accordance with the present invention.

In one embodiment with multiple pairs of electrodes 104, a starting time of a period of the duty cycle for a pair of electrodes 104 is offset from other start times of periods of the duty cycle of other pairs of electrodes 104. In a particular embodiment, the duty cycle module 304 includes a cyclonic module 306 that alternates duty cycles to create a circular pattern of when a medium voltage waveform is transmitted to pairs of electrodes 104. FIG. 6A is a one embodiment of a duty cycle timing diagram 600 for three pairs of electrodes 104 which demonstrates one embodiment of a cyclonic module 306. The diagram 600 includes a first duty cycle signal 602 and an associated, simplified first medium voltage waveform 604. A second duty cycle signal 606 and associated, simplified second medium voltage waveform 608 and a third duty cycle signal 610 and associated, simplified third medium voltage waveform 612 are also shown. Each duty cycle signal 602, 606, 610 has a same on time 614 and off time 616 within a duty cycle period 618, and each duty cycle on time 614 is approximately 30% and the duty cycle signals 602, 606, 610 are offset by one-third of the duty cycle period 618.

In the particular embodiment depicted in the diagram 600, a corresponding medium voltage waveform 604, 608, 612 includes a base switching frequency that is greater than a duty cycle switching frequency. Harmonic distortions of the medium voltage waveforms 604, 608, 612 are omitted for clarity. The medium voltage waveforms 604, 608, 612 may be transmitted each to a separate pair of electrodes 104, in the depicted embodiment, so that only one pair of electrodes 104 is active at one time. In an alternate embodiment, the duty cycle may increase such that there is an overlap and more than one pair of electrodes 104 is active at one time. The cyclonic module 306, in one embodiment uses timing similar to the diagram 600 of FIG. 6A so that each pair of electrodes 104 may turn on in a circular pattern, thus creating a rotating electromagnetic field 114 in a cyclonic pattern.

Figure 6B:
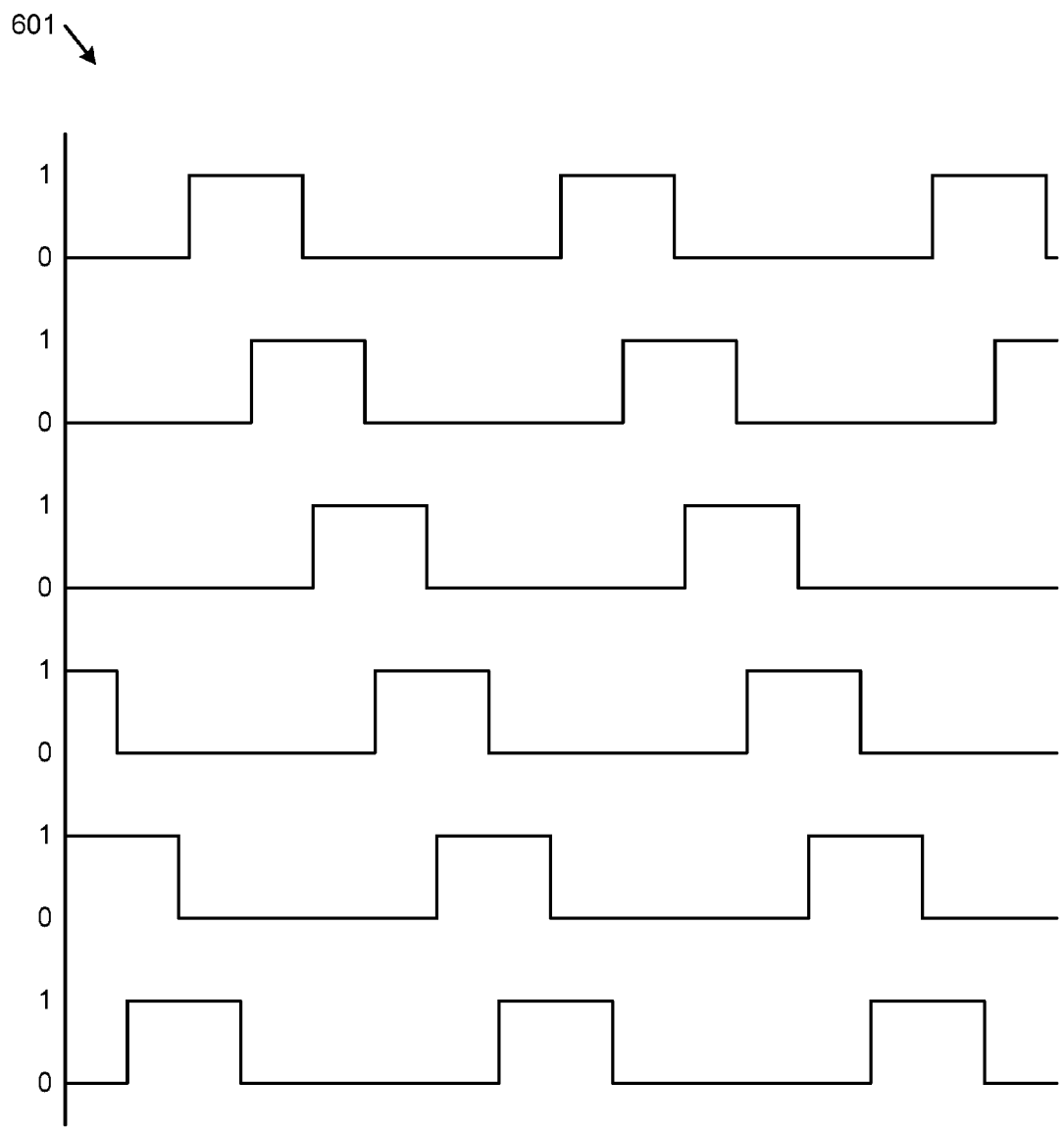
FIG. 6B is a one embodiment of a duty cycle timing diagram for six electrode pairs in accordance with the present invention.

In one embodiment of a nano-cluster module 102, experimentation has shown that a duty cycle of 1 (100%) where the medium voltage waveforms 604, 608, 612 for each pair of electrodes 104 is on continuously, may generate a high amount of ozone and may cause undesirable heating. In addition, experimentation has shown that a duty cycles of below 0.2 (20%) may not generate ozone. A duty cycle of around 0.3 to 0.4 may have a balance between delivering energy to particles of the raw material 118 and undesirable effects, such as ozone creation and overheating. Other embodiments of a nano-cluster module 102 with various raw materials 118 may have different results and other duty cycles may be desirable. FIG. 6B is a one embodiment of a duty cycle timing diagram 601 for six pairs of electrodes 104. A cyclonic module 306 may create a rotating electromagnetic field 114 with timing similar to that shown in FIG. 6B.

In one embodiment, the apparatus 300 includes a power balance module 308 that balances power between pairs of electrodes 104 in a set of pairs of electrodes 104. For example, the power balance module 308 may measure a power level at each pair of electrodes 104 and may increase or decrease power to each pair of electrodes 104 so that power consumed at each electrode is balanced. The apparatus 300 includes power sensors 314 that may be used in conjunction with the power balance module 308 to balance power. Each power sensor 314 may measure current and/or voltage at each pair of electrodes 104, as is known in the art. The power balance module 308 may then determine if there is an imbalance of power consumed by each pair of electrodes 104 and may adjust the power consumed at each pair of electrodes 104. In one embodiment, the power balance module 308 may adjust a duty cycle controlling medium voltage waveform on time for each pair of electrodes 104. In another embodiment, the power balance module 308 adjusts a voltage of one or more of the medium voltage waveforms transmitted to each pair of electrodes 104. One of skill in the art will recognize other ways that a power balance module 308 may balance power to one or more pairs of electrodes 104.

The apparatus 300, in one embodiment, includes an electromagnetic resonant amplifier 310. In another embodiment, the apparatus 300 includes an electron spin module 312. The electromagnetic resonant amplifier 310 will be discussed further in relation to FIGS. 7A and 7B. The electron spin module 312 will be discussed further in relation to FIG. 8.

Figure 4:
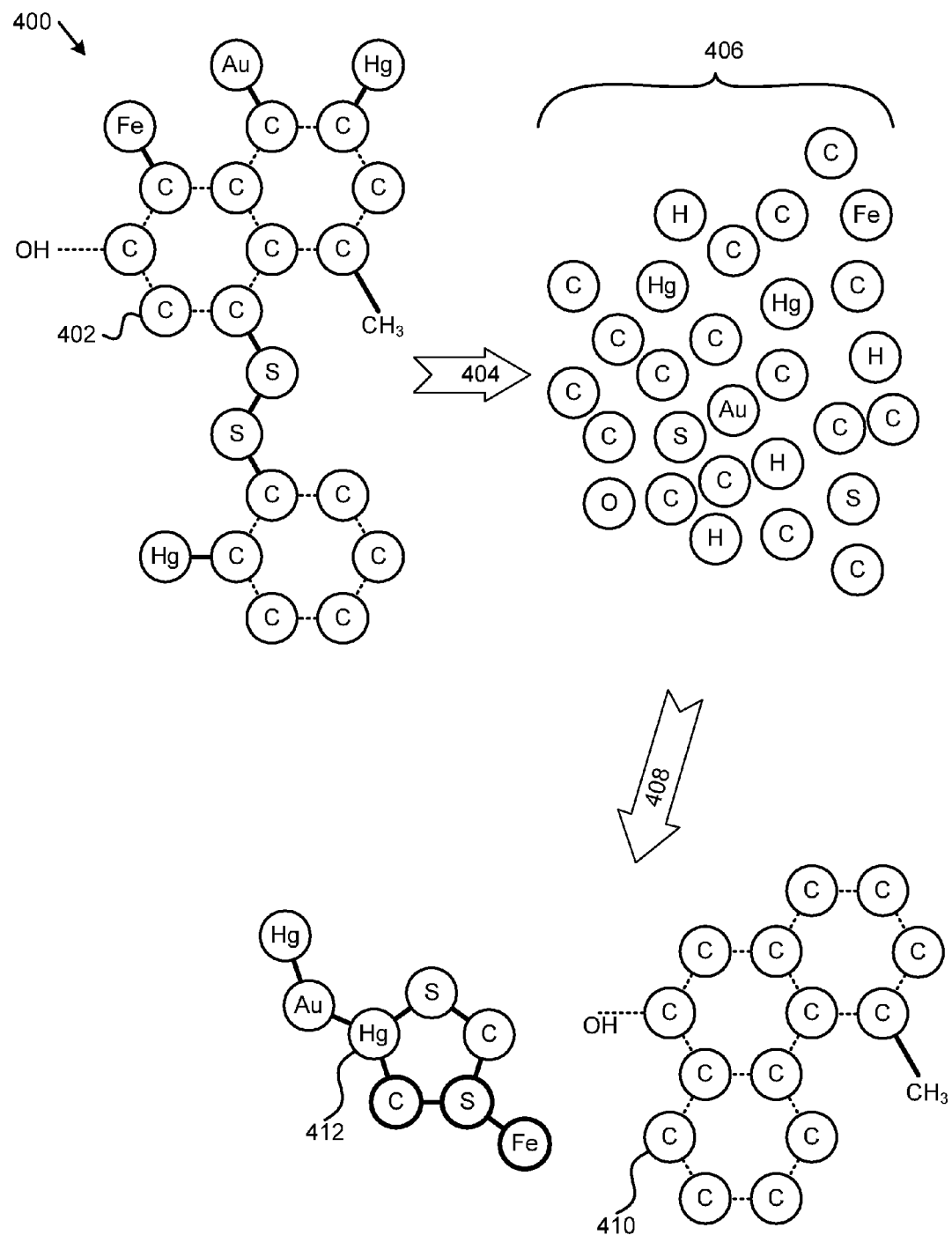
FIG. 4 is an illustration showing one possible chemical process in accordance with the present invention.

FIG. 4 is an illustration 400 showing one possible chemical process in accordance with the present invention. The illustration 400 depicts one molecule 402 that may be from a particle of the raw material 118 and process steps as the molecule flows through the reaction zone 110. Typically a material stream of molecules of the raw material 118 typically may not contain a homogeneous uniform molecule stream but may be a mixture of different molecules. The illustration 400 is simplified to only include one possible molecule, and the process shown may be applicable to many other molecules from various raw materials 118. A simplified representation of a raw material molecule 402 of a raw material 118 is shown. The raw material molecule 402, in the depicted embodiment, includes carbon atoms ("C"), sulfur atoms ("S"), mercury atoms ("Hg"), a gold atom ("Au"), an iron atom ("Fe"), oxygen atoms ("O"), and hydrogen atoms ("H"). The raw material molecule 402 may be coal, or other raw material 118 with chains of carbon atoms, that includes impurities, such as sulfur, mercury, etc.

The raw material molecule 402 is transferred 404 into the reaction zone 110 and, in one embodiment, molecular bonds between atoms of the raw material molecule 402 are broken in the electromagnetic field 114 resulting in a free floating elements 406 phase within the reaction zone 110. As the free floating elements 406 pass 408 out of the reaction zone 110, a purified material 410 and a nano-cluster 412 may result. For example, carbon atoms may have a tendency to recombine into a purified material 410 that has fewer impurities than the raw material molecule 402. The impurities may bond into various forms of a nano-cluster 412. In one embodiment, the nano-cluster 412 may be metallic in nature. Note that the purified material 410 may include some impurities (not shown).

The nano-clusters 412, in some embodiments, may be attracted to electrodes 104 or sides of a reaction chamber. In an embodiment with an element attraction module 302, a certain element, such as gold ("Au") may form on an electrode 104 or reaction chamber while the purified material 410 and nano-clusters 412 with less gold may pass out of the reaction zone 110. The combination of purified material 410 and nano-clusters 412 may enter another nano-cluster module 102 and may be further processed, or may pass out of the nano-cluster module 102.

FIG. 5 is a schematic block diagram 500 illustrating one embodiment of a medium voltage module 202 in accordance with the present invention. The medium voltage module 202 includes a microprocessor 502, drivers D1, D2, and D3, field-effect transistors ("FETs") Q1, Q2, and Q3, transformers T1, T2 and T3, output voltages Vo1, Vo2, and Vo3, a source voltage Vcc, a fuse 504, a ground Gnd, and sensor inputs 506, which are explained below. Note that the diagram 500 is simplified and functionally describes a circuit to implement a medium voltage module 202 while an actual circuit typically includes additional components.

In one embodiment, the medium voltage module 202 includes a microprocessor 502 that controls switching devices configured to connect transformers T1, T2, T3 between a source voltage Vcc and ground Gnd. A fuse 504 may be in line with the source voltage Vcc for protection again short circuits and overload. In the depicted embodiment, the switching devices are FETs Q1, Q2, Q3. The microprocessor 502 may be one embodiment of the duty cycle module 304 and/or the cyclonic module 306 and may generate control signals in the form of duty cycles. In one embodiment, the microprocessor 502 may generate control signals similar to those shown in FIGS. 6A and 6B. The microprocessor 502, in one embodiment, generates a signal to turn a switching device (e.g. Q1) on and off at a base switching frequency during a duty cycle on time 614 and then generates an off signal to keep the switching device Q1 off during a duty cycle off time 616. In another embodiment, the microprocessor 502 generates a signal to turn a switching device (e.g. Q1) on continuously during a duty cycle on time 614 and then generates an off signal to keep the switching device Q1 off during a duty cycle off time 616.

The microprocessor 502 may generate signals as inputs to driver circuits D1, D2, D3 that then drive the switching devices (e.g. Q1, Q2, Q3). The microprocessor 501 may have inputs for control, such as sensor inputs 506 from power sensors 314 wherein the microprocessor 502 is at least part of an embodiment of a power balance module 308. The microprocessor 502 may also include other inputs to control switching frequency, timing, etc. In other embodiments, the medium voltage module 202 includes other circuits and devices in place of a microprocessor 502. For example, one or more chips made exclusively for duty cycle control, such as a 555 timer circuit, along with other discrete logic may be used. In another embodiment, the microprocessor 502 may be replaced by a field programmable gate array ("FPGA"), an application specific integrated circuit ("ASIC"), or the like. One of skill in the art will recognize other ways to implement a microprocessor 502 or other control circuit.

In one embodiment, the medium voltage module 202 includes driver circuits D1, D2, D3 and switching devices, such as FETs Q1, Q2, Q3, for example a metal-oxide semiconductor field effect transistor ("MOSFET"). While FETs Q1, Q2, Q3 are depicted, other switching devices, such as bi-polar transistors, relays, etc. The driver circuits D1, D2, D3 are configured to drive the particular type of switching device used and to typically receive a logic signal as input from the microprocessor 502 or other control device.

The medium voltage module 202, in the depicted embodiment, is configured as a simple chopper circuit that receives an input voltage Vcc and applies it to three transformers T1, T2, T3 by closing the switching device Q1, Q2, Q3. In the embodiment shown in FIG. 5, the medium voltage module 202 is configure to control up to three pairs of electrodes 104. When a FET (e.g. Q1) closes, the source voltage Vcc is connected to a primary windings of a transformer (e.g. T1) and the transformer develops a voltage across secondary windings of the transformer so that a secondary voltage appears on the secondary of the transformer T1. The secondary voltages for the transformers are shown as outputs Vo1, Vo2, Vo3. The output voltages Vo1, Vo2, Vo3 are typically related to the input voltages, in this case the source voltage Vcc, by a turns ratio. In one embodiment, the source voltage Vcc is low voltage, such as between 24 VDC and 200 VDC and is boosted by the transformers T1, T2, T3 to a medium voltage. In one embodiment, the turns ratio of the transformers is such that the output voltages Vo1, Vo2, Vo3 are around 10,000 V.

The source voltage Vcc may be alternating current ("AC") or direct current ("DC"). In one embodiment, where the source voltage is AC, the medium voltage module 202 may include a rectifier circuit (not shown) to convert the AC voltage to a DC voltage. In another embodiment, a DC voltage is input to the transformers T1, T2, T3 and the switching devices Q1, Q2, Q3 switch at a base switching frequency during a duty cycle on time 614 stop switching during a duty cycle off time 616. In another embodiment, an AC voltage is input to the transformers T1, T2, T3 with a frequency matching the base switching frequency and the switching devices Q1, Q2, Q3 switch on and off based on the duty cycle. In the embodiment, the medium voltage module 202 may include a means to convert a source voltage Vcc to an AC voltage at the base switching frequency. One of skill in the art will recognize other ways to generate a medium voltage waveform switched at a base switching frequency during a duty cycle on time 614 and off during a duty cycle off time 616.

In one embodiment, the output voltages Vo1, Vo2, Vo3 include harmonic distortions. Typical choppers and other DC-to-DC converters often seek to minimize harmonic distortions by including damper circuits, snubbers, and the like. In one embodiment, the medium voltage module 202, along with other circuits and modules, such as the electromagnetic resonant amplifier 310, does not intentionally dampen harmonic distortion but instead enhances harmonic distortion to provide a broad spectrum of frequencies in a medium voltage waveform fed to the electrodes 104. The transformers T1, T2, T3, and possibly other associated components, may be designed to produce the broad spectrum of frequencies as well as one or more specific frequencies. The broad frequency generation module 204 and element attraction module 302 may be incorporated in the design of the transformers T1, T2, T3, electromagnetic resonant amplifier 310, and other components, such as capacitors, inductors, etc.

While the medium voltage module 202 depicted is a simple chopper circuit, other topologies may be used. For example, topologies that may be incorporated into the medium voltage module 202 may include a boost-derived converter, a buck-derived converter, a flyback converter, a buck-boost converter, a half-bridge converter, and the like. Typically the input voltage Vcc is lower than the output voltages Vo1, Vo2, Vo3, so some type of transformer T1, T2, T3 may be included. One of skill in the art will recognize other ways to implement medium voltage module 202 that generates a medium voltage waveform.

Figure 7A:
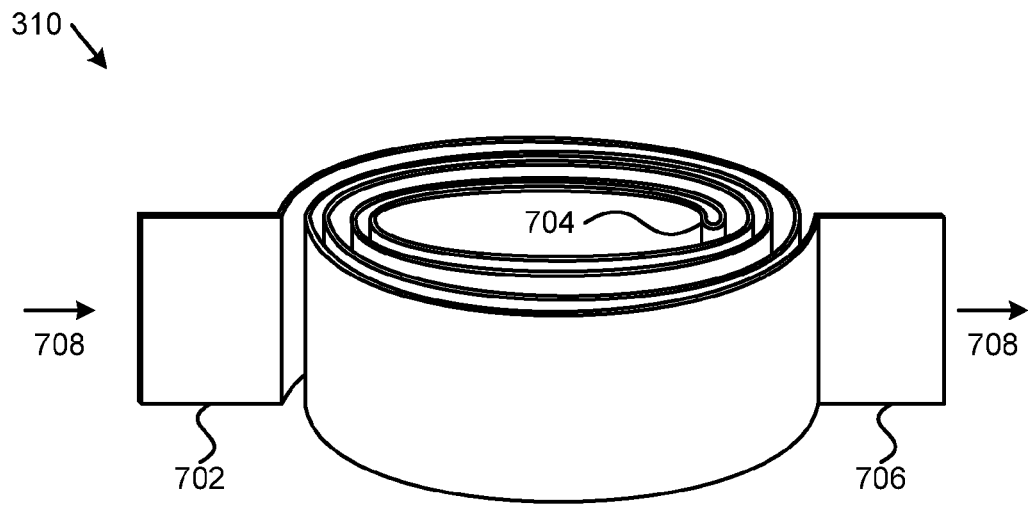
FIG. 7A is a schematic block diagram illustrating a perspective view of one embodiment of an electromagnetic resonant amplifier in accordance with the present invention.
Figure 7B:
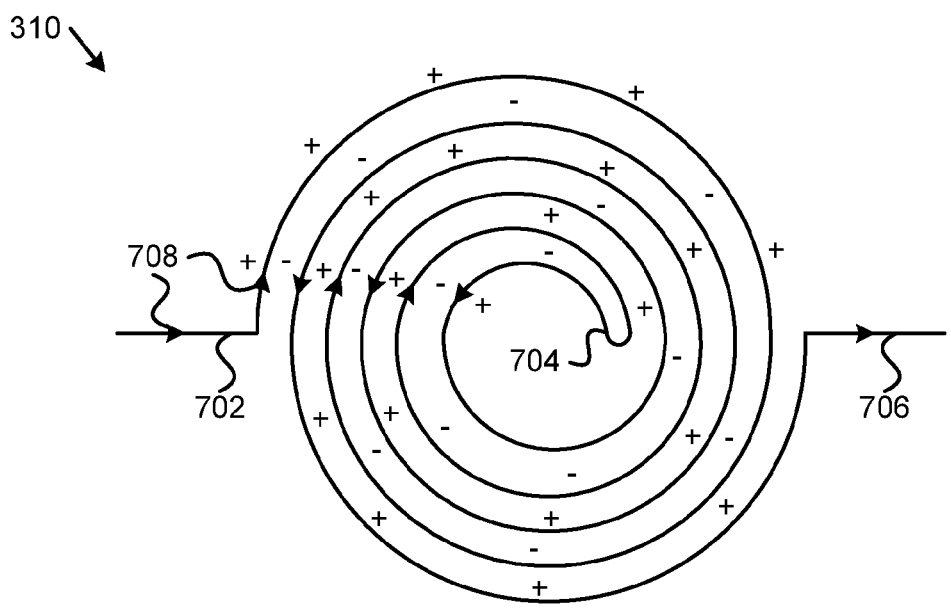
FIG. 7B is a schematic block diagram illustrating a top view of one embodiment of an electromagnetic resonant amplifier in accordance with the present invention.

FIGS. 7A and 7B are a schematic block diagram illustrating a perspective view and a top view of one embodiment of an electromagnetic resonant amplifier 310 in accordance with the present invention. The electromagnetic resonant amplifier 310, in one embodiment, is configured to amplify the medium voltage waveform from the medium voltage module 202. In one embodiment, the electromagnetic resonant amplifier 310 amplifies amplitudes of portions of the medium voltage waveform associated with the broad spectrum of frequencies and/or specific frequencies. For example, the electromagnetic resonant amplifier 310 amplifies amplitudes of harmonic frequencies within the medium voltage waveform.

The electromagnetic resonant amplifier 310, in one embodiment, is constructed from a flat, ribbon-like conductive material coated with a non-conductive coating. For example, the electromagnetic resonant amplifier 310 may be constructed of a copper ribbon coated with a non-conductive coating. In one embodiment, the electromagnetic resonant amplifier 310 may start at a first end 702 and may wind clockwise to a center 704, where the conductor reverses and is wound counterclockwise back out to a second end 706. One of skill in the art recognizes that the ends 702, 706 may be situated anywhere around the electromagnetic resonant amplifier 310. Arrows 708 show a current direction through the conductor.

Notice that most coils are wound in a single direction and one conductor layer is adjacent to another conductor layer and an electromagnetic field generated by the adjacent coils cancel. In the depicted embodiment, the electromagnetic resonant amplifier 310 includes coils with current 708 in a clockwise direction adjacent to coils with current in a counterclockwise direction, which causes an additive effect on the generated electromagnetic field. According to the right-hand rule, if the thumb of the right hand points the direction of current in a conductor, the fingers of the right hand curl in the direction of electromagnetic field lines. Plus and minus signs on FIG. 7B indicate a direction of electromagnetic field lines where the plus signs indicate an electromagnetic field coming out of the page while minus signs indicate and electromagnetic field going into the page. The electromagnetic fields in the electromagnetic resonant amplifier 310 are additive and have a tendency to amplify harmonic signals. While a flat, ribbon-like conductor is depicted, other shapes of conductors may be used and wound in the pattern shown to enhance electromagnetic field strength between coils.

Note that the depicted embodiment shows a loose winding that does not extend to the center for simplicity. Other embodiments may have more tightly wound coils that wind to the center of the coil. In addition, the non-conductive coating on the conductor holds the coils apart, which allows for capacitive coupling between coils. The non-conductive coating may also vary in thickness and material to change the capacitive coupling of the windings. The capacitive coupling and self inductance of the electromagnetic resonant amplifier 310 along with the additive nature of the electromagnetic fields may combine to amplify harmonic frequencies present in the medium voltage waveform input to the electromagnetic resonant amplifier 310. The conductor type and shape, the thickness and material used for the non-conductive coating, number of windings, and other design parameters of the electromagnetic resonant amplifier 310 may all be manipulated to achieve a desired effect and/or to change amplification of certain frequencies. One of skill in the art will recognize other ways to construct the electromagnetic resonant amplifier 310 and ways to adjust parameters to achieve a particular resonant effect.

Figure 8:
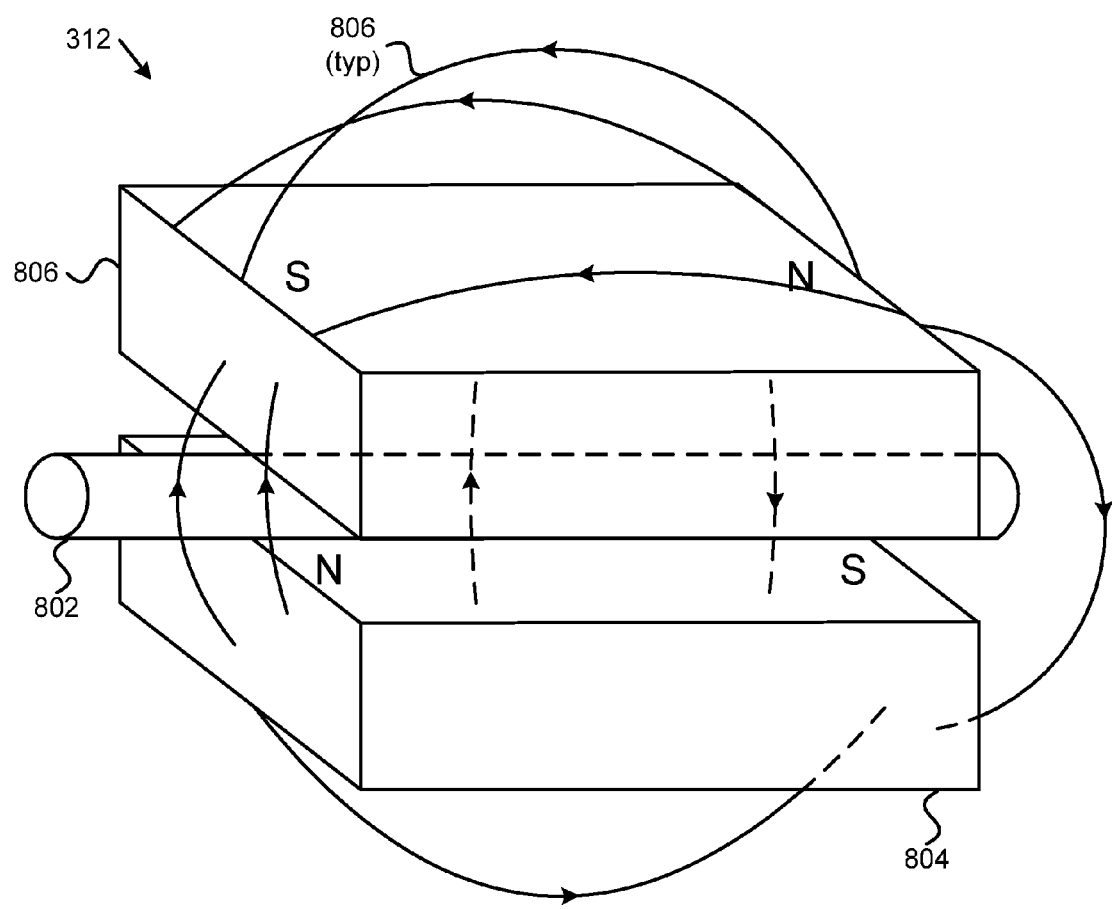
FIG. 8 is a schematic block diagram illustrating a perspective view of one embodiment of an electron spin module in accordance with the present invention.

FIG. 8 is a schematic block diagram illustrating a perspective view of one embodiment of an electron spin module 312 in accordance with the present invention. The electron spin module 312 includes a conductor 802, a bottom magnetic structure 804, and a top magnetic structure 806, which are described below. The electron spin module 312, in one embodiment, aligns a spin of electrons within the medium voltage waveform. In another embodiment, the electron spin module 312 aligns the spin of electrons by inducing a magnetic field in a conductor 802 that conducts the medium voltage waveform to the electrodes 104. The conductor 802 is depicted as a round conductor, but may be of a different shape.

A magnetic field generated by the magnetic structures 804, 806 is shown as arrows 808 around and in the magnetic structures 804, 806. As electrons travel in the conductor 802, electrons within the conductor are affected by the magnetic field. The magnetic field has a tendency to orient electrons in a particular alignment so that the electrons exiting the electron spin module 312 have a tendency to be more in alignment as the electrons travel to the electrodes 104. Experimentation has shown that embodiments of the electron spin module 312 have a positive effect on the raw material 118 passing through the electromagnetic field to increase a yield of nano-clusters.

The top and bottom magnetic structures 804, 806, in one embodiment are permanent magnets. In another embodiment, the top and bottom magnetic structures 804, 806 are electromagnets. In other embodiments, the electron spin module 312 may include magnetic structures that surround the conductor. In another embodiment, the conductor includes a gas tube, such as a fluorescent tube surrounded by a magnetic structure. One of skill in the art will recognize other magnetic structures and ways to create a magnetic field to affect electron spin in current in a conductor 802 connected to the electrodes 104.

Figure 9:
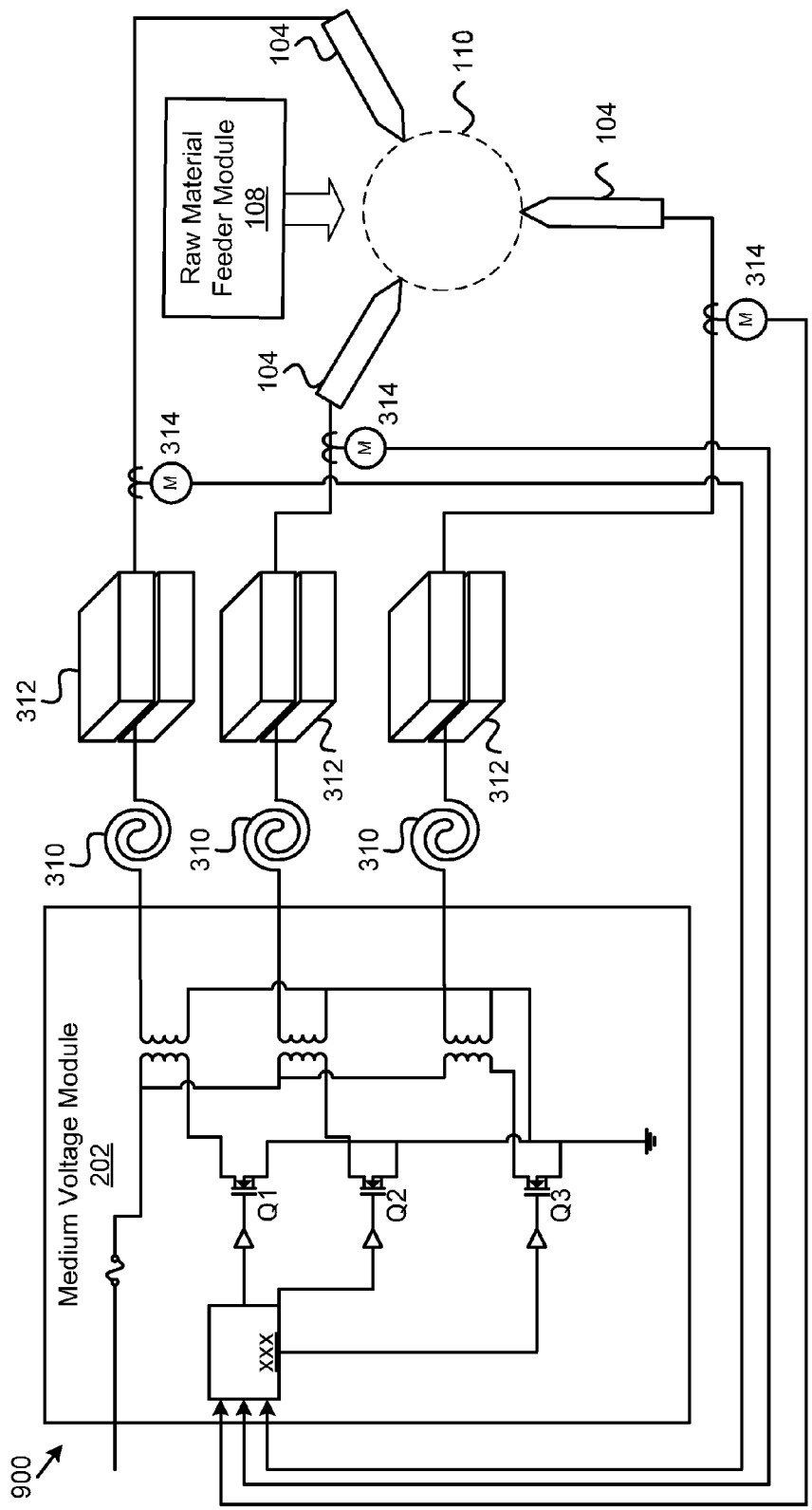
FIG. 9 is a schematic block diagram illustrating another embodiment of an apparatus for growing nano-clusters in accordance with the present invention.

FIG. 9 is a schematic block diagram illustrating another embodiment of an apparatus 900 for growing nano-clusters in accordance with the present invention. The apparatus 900 is a more particular embodiment of the apparatus 300 depicted in FIG. 3 with three pairs of electrodes 104, and may be a nano-cluster module 102. In the depicted embodiment, the apparatus 900 includes a medium voltage module 202, electromagnetic resonant amplifiers 310, electron spin modules 312, a raw material feeder module 108, three pairs of electrodes 104, and power sensors 314. The medium voltage module 202 is substantially similar to the medium voltage module 202 describe in relation to FIG. 5. The electromagnetic resonant amplifiers 310 are substantially similar to the electromagnetic resonant amplifier 310 described in relation to FIG. 7. The electron spin modules 312 are substantially similar to the electron spin module 312 described in relation to FIG. 8. The power sensors 314 are substantially similar to those described in relation to FIG. 3 and the power balance module 308. The apparatus 900 may be used alone as a single nano-cluster module 102 or as one in a series of nano-cluster modules 102 where processed material 120 from one nano-cluster module 102 is the raw material 118 for a next nano-cluster module 102.

Figure 10A:
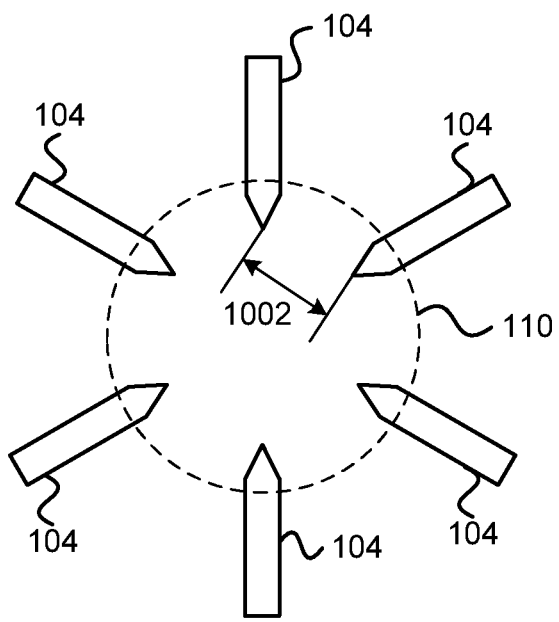
FIG. 10A is a schematic block diagram illustrating a top view of one embodiment of electrode spacing and configuration for six electrode pairs in accordance with the present invention.
Figure 10B:
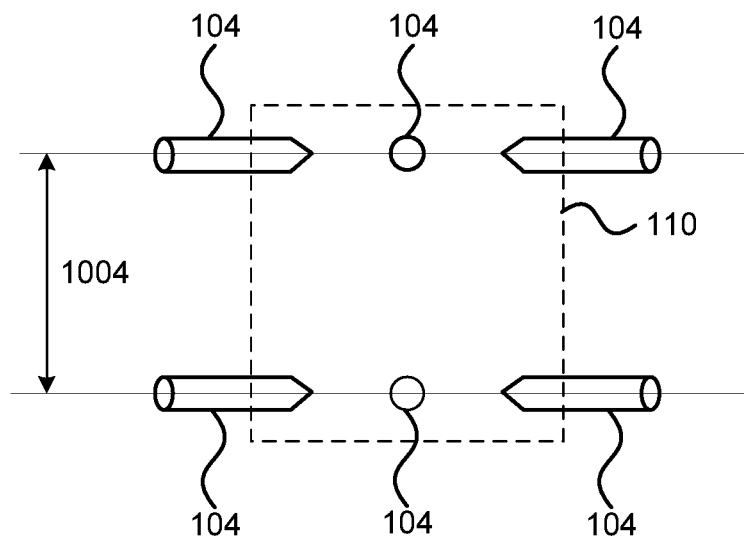
FIG. 10B is a schematic block diagram illustrating a side view of one embodiment of electrode spacing and configuration for six electrode pairs in accordance with the present invention.

FIGS. 10A and 10B are a schematic block diagrams illustrating a top view and a side view of one embodiment of electrode spacing and configuration for six pairs of electrodes 104 in accordance with the present invention. In FIG. 10A, the electrode pairs are arranged in a circle so that a reaction zone 110 is in the middle of the circle. The pairs of electrodes 104, in one embodiment, are separated by an electrode-pair-to-electrode-pair spacing 1002, which is the same for each pair of electrodes 104. In another embodiment, the electrode-pair-to-electrode-pair spacing 1002 differs between pairs of electrodes 104. In one embodiment, the reaction zone 110 is a reaction chamber with a physical barrier to guide raw material through the reaction zone 110. In the depicted embodiment, ends of the pairs of electrodes extend into the reaction chamber. In other embodiments, the reaction chamber is sized differently and may be interior to the electrodes 104.

The size view depicted in FIG. 10B shows spacing between electrodes 104 within pairs of electrodes 104. In the depicted embodiment, the electrodes 104 of a pair of electrodes 104 are spaced vertically by an electrode pair spacing 1004. In other embodiments, an electrode pair spacing 1004 for one pair of electrodes 104 may differ from an electrode pair spacing 1004 of another pair of electrodes 104. The reaction zone 110 is shown as extending vertically and may be a reaction chamber in the form of a tube. In other embodiments, a reaction chamber may have a different shape.

Figure 11:
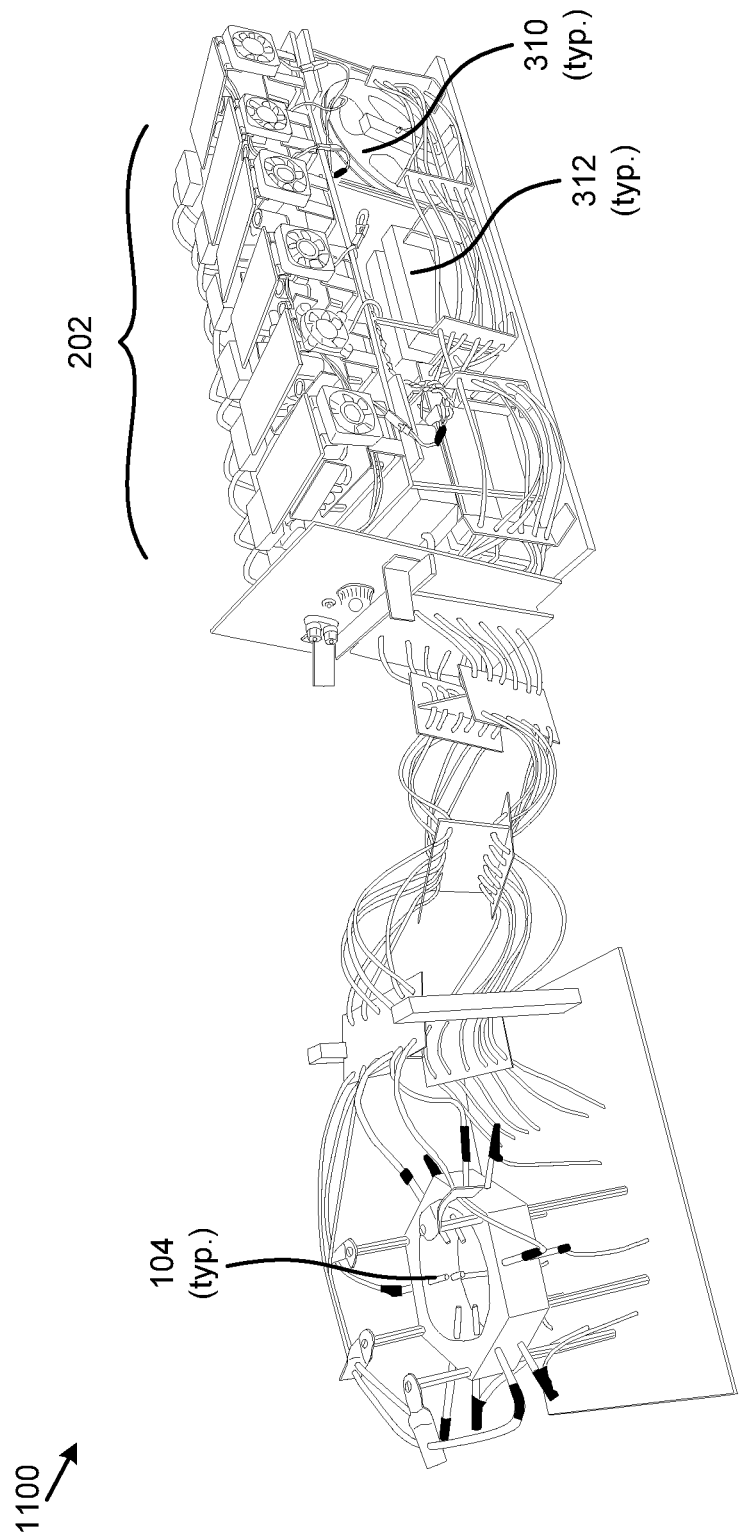
FIG. 11 is a schematic block diagram illustrating a perspective view of one embodiment of an apparatus for growing nano-clusters in accordance with the present invention.

FIG. 11 is a schematic block diagram illustrating a perspective view of one embodiment of an apparatus 1100 for growing nano-clusters in accordance with the present invention. The apparatus 1100 may be similar to the apparatus 900 in FIG. 9 and includes a medium voltage module 202, electromagnetic resonant amplifiers 310, electron spin modules 312, six pairs of electrodes 104, and other components described above.

Figure 12:
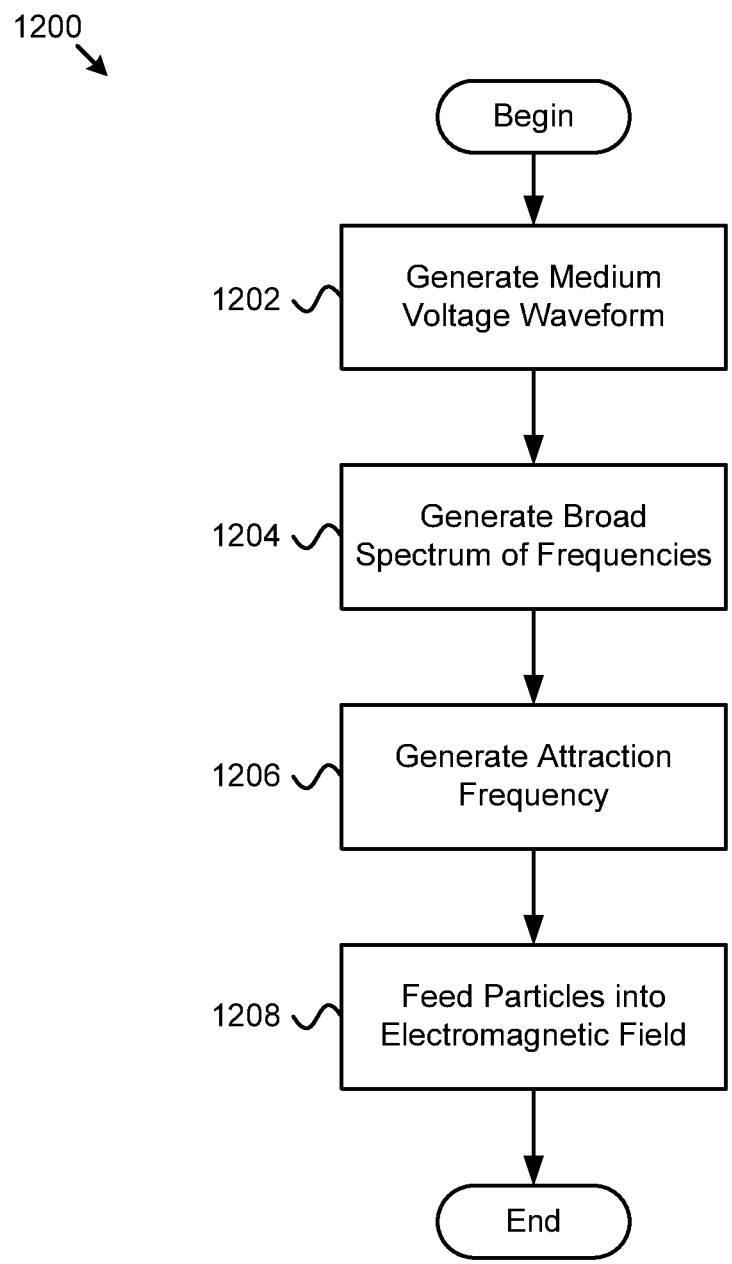
FIG. 12 is a schematic flow chart diagram illustrating one embodiment of a method for growing nano-clusters in accordance with the present invention.

FIG. 12 is a schematic flow chart diagram illustrating one embodiment of a method 1200 for growing nano-clusters in accordance with the present invention. The method 1200 begins and the field generation module 106 generates 1202 a medium voltage waveform and transmits the medium voltage waveform to one or more pairs of electrodes 104 to generate corona discharge 112 across each pair of electrodes 104. Electrodes with each pair of electrodes 104 are separated by an electrode pair spacing 1004 and pairs of electrodes 104 are separated by an electrode-pair-to-electrode-pair spacing 1002. The corona discharge 112 generates an electromagnetic field 114 across the electrodes 104. A voltage potential across the electrodes is a medium voltage.

Figure 13:
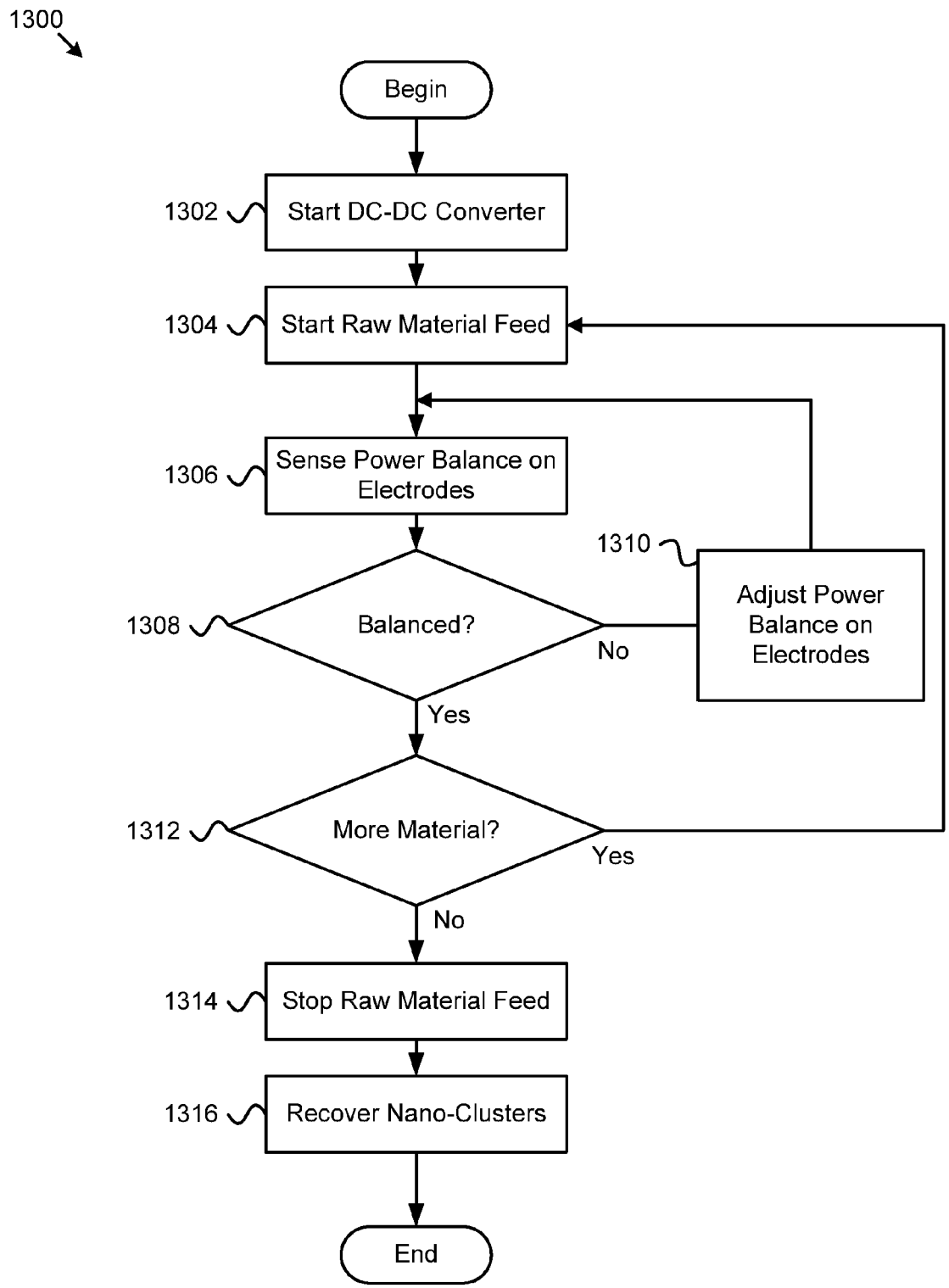
FIG. 13 is a schematic flow chart diagram illustrating another embodiment of a method for growing nano-clusters in accordance with the present invention.

A broad frequency generation module 204 generates 1204 a broad spectrum of frequencies within the medium voltage waveform and an element attraction module 302 generates 1206 one or more attraction frequencies within the medium voltage waveform. Each attraction frequency is a frequency selected to cause a resonance within atoms of a specific element. A raw material feeder module 108 feeds 1208 particles of a raw material 118 through the electromagnetic field 114, and the method 1200 ends. The raw material 118 includes atoms of the specific element. The electromagnetic field 114, with the broad spectrum of frequencies, operates to separate at least a portion of the raw material 114 fed 1208 through the electromagnetic field 114 into free atoms. The attraction frequency is operative to cause atoms of the specific element to resonate between the electrodes 104 and gather on one or more of the electrodes 104 as nano-clusters FIG. 13 is a schematic flow chart diagram illustrating another embodiment of a method 1300 for growing nano-clusters in accordance with the present invention. The method 1300 begins and the method 1300 starts 1302 a DC-to-DC converter. In one embodiment, the DC-to-DC converter is part of a medium voltage module 202. The method 1300 feeds 1304 raw material 118 into a reaction zone 110 of a nano-cluster module 102. In one embodiment, a raw material feeder module 108 feeds 1304 the raw material 118.

The method 1300 senses 1306 power balance on pairs of electrodes 104. In one embodiment, a power balance module 308 in conjunction with power sensors 314 senses 1306 power balance. The method 1300 determines 1308 if power is balanced between pairs of electrodes 104. If the method 1300 determines 1308 that power is not balanced, the method adjusts 1310 power balance on the electrodes 104. In one embodiment, the power balance module 308 senses and adjusts 1310 power of the electrodes 104 and the power balance module 308 senses power on a pair of electrodes 104 using power sensors 314. If the method 1300 determines 1308 that power is balanced between pairs of electrodes 104, the method 1300 determines 1312 if more raw material 118 is available.

If the method 1300 determines 1312 that more raw material 118 is available, the method 1300 returns and feeds 1304 raw material 106 into the reaction zone 110. If the method 1300 determines 1312 that more raw material 118 is not available, the method 1300 stops 1314 feeding raw material 118 into the reaction zone 110 and recovers 1316 nano-clusters from electrodes 104 and/or sides of a reaction chamber, and the method 1300 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for growing nano-clusters, the apparatus comprising:

a pair of electrodes separated by an electrode pair spacing;

a field generation module that generates a corona discharge across the electrodes, the corona discharge generating an electromagnetic field near the electrodes, a voltage potential across the electrodes comprising a medium voltage of between about 1 kilo Volt ("kV") and 35 kV, the field generation module comprising a medium voltage module that generates a medium voltage waveform, the medium voltage waveform transmitted to the electrodes to generate the corona discharge; and a broad frequency generation module that generates a broad spectrum of frequencies within the medium voltage waveform, the broad spectrum of frequencies comprising a switching frequency of about 22 kilohertz ("kHz") or higher and a plurality of harmonic frequencies higher than the switching frequency; and an element attraction module that generates one or more attraction frequencies within the medium voltage waveform, wherein each attraction frequency comprises a frequency selected to cause a resonance within atoms of a specific element, the raw material comprising atoms of the specific element, wherein the attraction frequency is operative to cause atoms of the specific element to resonate between the electrodes and gather together in a nano-cluster; and a raw material feeder module that feeds particles of a raw material through the electromagnetic field adjacent to the corona discharge occurring between the electrodes and in a direction parallel to a line between the electrodes where the corona discharge occurs, the electromagnetic field comprising the broad spectrum of frequencies is operative to separate at least a portion of the raw material fed through the electromagnetic field into free atoms.

2. The apparatus of claim 1, wherein the pair of electrodes comprise a pair of electrodes within a set of two or more pairs of electrodes.

3. The apparatus of claim 2, wherein each electrode pair is separated by an electrode pair spacing and each pair of electrodes is separated by an electrode-pair-to-electrode-pair spacing, wherein each pair of electrodes is oriented in a first orientation direction and the electrode-pair-to-electrode-pair spacing between pairs of electrodes is in a direction perpendicular to the electrode pair spacing.

4. The apparatus of claim 2, wherein the field generation module further comprises a duty cycle module that adjusts a duty cycle of the medium voltage waveform transmitted to each pair of electrodes, wherein the duty cycle comprises an on time and an off time, the on time and the off time comprising a duty cycle period, the on time comprising a period when the medium voltage waveform is transmitted to a pair of electrodes and the off time comprises a time when the medium voltage waveform is not transmitted to the pair of electrodes, wherein a starting time of a period of the duty cycle for a pair of electrodes is offset from other start times of periods of the duty cycle of other pairs of electrodes.

5. The apparatus of claim 4, wherein the set of pairs of electrodes comprises three or more pairs of electrodes and wherein the duty cycle module further comprises a cyclonic module that alternates duty cycles to create a circular pattern of when a medium voltage waveform is transmitted to pairs of electrodes.

6. The apparatus of claim 5, wherein for each of the pairs of electrodes are positioned wherein a first electrode of an electrode pair is positioned vertically above a second electrode of the electrode pair and wherein the first electrodes of the pairs of electrodes are positioned in a horizontal first plane and in a circular pattern and the second electrodes of the pairs of electrodes are positioned in a horizontal second plane below the first plane and in a circular pattern, wherein the cyclonic module creates the circular pattern of the medium voltage waveform where, when the cyclonic module provides the medium voltage to a first electrode of an electrode pair, corona discharge is formed between the first electrode and at least the second electrode of the electrode pair, wherein the cyclonic module creates corona discharge in a circular pattern on the pairs of electrodes to form a circular reaction chamber, wherein the raw material feeder module fees the particles into a top of the reaction chamber and wherein the particles are propelled through the reaction chamber under the force of gravity.

7. The apparatus of claim 6, wherein the cyclonic module has a duty cycle frequency of about 10 kHz or higher and the switching frequency is higher than the duty cycle frequency.

8. The apparatus of claim 4, wherein an inverse of the period of the duty cycle comprises a duty cycle frequency and wherein a switching frequency of the medium voltage waveform is a higher frequency than the duty cycle frequency.

9. The apparatus of claim 2, wherein the medium voltage module converts an input voltage to one or more medium voltage, direct current ("DC") waveforms, each waveform transmitted to a pair of electrodes, each waveform comprising a plurality of harmonic frequencies.

10. The apparatus of claim 2, wherein the field generation module further comprises a power balance module that balances power between pairs of electrodes in the set of pairs of electrodes.

11. The apparatus of claim 2, wherein the set of two or more pairs of electrodes are arranged around a reaction chamber wherein an end of each electrode is closest to the reaction chamber, wherein each electrode of a pair of electrodes comprises a positive electrode and a negative electrode and wherein the positive electrodes of the set of pairs electrodes are arranged in a first plane and the negative electrodes of the set of pairs electrodes are arranged in a second plane.

12. The apparatus of claim 11, wherein the reaction chamber comprises sides, the sides configured to contain particles of the raw material as the particles of raw material pass through the electromagnetic field.

13. The apparatus of claim 1, wherein the pair of electrodes are oriented vertically.

14. The apparatus of claim 13, wherein the raw material feeder feeds the particles of raw material vertically through the electromagnetic field wherein a gravity force propels the particles of raw material through the electromagnetic field.

15. The apparatus of claim 1, wherein the field generation module further comprises an electromagnetic resonant amplifier that amplifies harmonic frequencies within the medium voltage waveform.

16. The apparatus of claim 15, wherein the electromagnetic resonant amplifier comprises a rectangular strip with a non-conductive coating, the rectangular strip wound into a coil, the coil comprising a first half of the rectangular strip wound around a second half of the rectangular strip and connected in a center, wherein current enters in the first half of the rectangular strip and travels around to the center of the coil and then travels in a reverse direction in the second half of the rectangular strip and out of the second half of the rectangular strip, wherein space between adjacent sections of the rectangular strip form a capacitive coupling based at least in part on the non-conductive coating.

17. The apparatus of claim 1, wherein the field generation module further comprises an electron spin module that aligns a spin of electrons within the medium voltage waveform.

18. The apparatus of claim 17, wherein the electron spin module aligns the spin of electrons within the medium voltage waveform by inducing a magnetic field in a conductor that conducts the medium voltage waveform to the electrodes.

19. The apparatus of claim 18, wherein the electron spin module comprises one or more magnets surrounding the conductor.

20. A system to grow nano-clusters, the system comprising:
one or more nano-cluster modules, each nano-cluster module comprising:
two or more pairs of electrodes, electrodes within each electrode pair separated by an electrode pair spacing and each pair of electrodes separated by an electrode-pair-to-electrode-pair spacing, wherein each pair of electrodes is oriented in a first orientation direction and the electrode-pair-to-electrode-pair spacing between pairs of electrodes is in a direction perpendicular to the electrode pair spacing;
a field generation module that generates a corona discharge across the electrodes, the corona discharge generating an electromagnetic field near the electrodes, a voltage potential across the electrodes comprising a medium voltage of between about 1 kilo Volt ("kV") and 35 kV, the field generation module comprising;
a medium voltage module that generates a medium voltage waveform, the medium voltage waveform transmitted to the electrodes to generate the corona discharge; and
a broad frequency generation module that generates a broad spectrum of frequencies within the medium voltage waveform, the broad spectrum of frequencies comprising a switching frequency of about 22 kilohertz ("kHz") or higher and a plurality of harmonic frequencies higher than the switching frequency; and
an element attraction module that generates one or more attraction frequencies within the medium voltage waveform, wherein each attraction frequency comprises a frequency selected to cause a resonance within atoms of a specific element, the raw material comprising atoms of the specific element, wherein the attraction frequency is operative to cause atoms of the specific element to resonate between the electrodes and gather together in a nano-cluster; and
a raw material feeder module that feeds particles of a raw material through the electromagnetic field adjacent to the corona discharge occurring between the electrodes and in a direction parallel to a line between the electrodes where the corona discharge occurs, the electromagnetic field with the broad spectrum of frequencies operative to separate at least a portion of the raw material fed through the electromagnetic field into free atoms,
wherein particles of raw material exiting a nano-cluster module feed into the raw material feeder module of a next nano-cluster module.

21. The system of claim 20, wherein each nano-cluster module includes an element attraction module with an attraction frequency for a different specific element.

22. The system of claim 20, further comprising a material crushing module that crushes particles of the raw material into smaller particles before being fed into the raw material feeder module.

23. A method for growing nano-clusters, the method comprising:

generating a medium voltage waveform and transmitting the medium voltage waveform to one or more pairs of electrodes to generate corona discharge across each pair of electrodes, electrodes within each pair of electrodes separated by an electrode pair spacing, each pair of electrodes separated by an electrode-pair-to-electrode-pair spacing, the corona discharge generating an electromagnetic field near the electrodes, a voltage potential across the electrodes comprising a medium voltage of between about 1 kilo Volt ("kV") and 35 kV;

generating a broad spectrum of frequencies within the medium voltage waveform, the broad spectrum of frequencies comprising a switching frequency of about 22 kilohertz ("kHz") or higher and a plurality of harmonic frequencies higher than the switching frequency;

generating one or more an attraction frequencies within the medium voltage waveform, wherein each attraction frequency comprises a frequency selected to cause a resonance within atoms of a specific element; and feeding particles of a raw material through the electromagnetic field adjacent to the corona discharge occurring between the electrodes and in a direction parallel to a line between the electrodes where the corona discharge occurs, the raw material comprising atoms of the specific element, the electromagnetic field with the broad spectrum of frequencies operative to separate at least a portion of the raw material fed through the electromagnetic field into free atoms, wherein the attraction frequency is operative to cause atoms of the specific element to resonate between the electrodes and gather in a nano-cluster.

24. The method of claim 23, further comprising cycling the medium voltage waveform for each pair of electrodes at a duty cycle rate, an on time for each duty cycle for a pair of electrodes offset from the on time for the duty cycles of other pairs of electrodes.

* * * * *